US012659025B2

(12) United States Patent
Roy et al.

(10) Patent No.: US 12,659,025 B2
(45) Date of Patent: Jun. 16, 2026

(54) RESOURCE AND MISSION AWARE POWER MANAGEMENT FOR NON-GEOSYNCHRONOUS ORBIT SMALLSATS

(71) Applicant: Hughes Network Systems, LLC, Germantown, MD (US)

(72) Inventors: Satyajit Roy, Gaithersburg, MD (US); George Joseph Choquette, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 86 days.

(21) Appl. No.: 18/887,170

(22) Filed: Sep. 17, 2024

(65) Prior Publication Data

US 2026/0081679 A1     Mar. 19, 2026

(51) Int. Cl.
*H04B 7/185* (2006.01)
*H04L 5/00* (2006.01)
*H04W 52/06* (2009.01)

(52) U.S. Cl.
CPC ....... *H04B 7/18543* (2013.01); *H04L 5/0044* (2013.01); *H04W 52/06* (2013.01)

(58) Field of Classification Search
CPC ... H04B 7/18543; H04L 5/0044; H04W 52/06
See application file for complete search history.

(56) References Cited

U.S. PATENT DOCUMENTS

| | | | | |
|---|---|---|---|---|
| 10,506,528 B2 * | 12/2019 | Almquist | ............ | H04W 52/267 |
| 10,547,375 B1 * | 1/2020 | Iyer | ....................... | H04L 5/0098 |
| 2017/0238305 A1 * | 8/2017 | Chen | ..................... | H04L 5/0053 |
| | | | | 370/311 |
| 2023/0109635 A1 | 4/2023 | Palermo et al. | | |
| 2023/0344511 A1 * | 10/2023 | Choinière | ............. | H04W 24/02 |
| 2023/0403071 A1 * | 12/2023 | Chen | .................. | H04B 7/18513 |
| 2024/0195493 A1 * | 6/2024 | Medarametla Lakshmi | ................ | |
| | | | | H04B 17/318 |
| 2025/0159616 A1 * | 5/2025 | Lauridsen | .......... | H04B 7/18543 |

OTHER PUBLICATIONS

Gupta, et al., "Traffic-Aware Satellite Switch-off Technique for LEO Constellations", Institute of Electrical and Electronics Engineers, Dec. 4, 2022, pp. 880-885.

* cited by examiner

*Primary Examiner* — Jaison Joseph
(74) *Attorney, Agent, or Firm* — Kilpatrick Townsend & Stockton LLP

(57) ABSTRACT

Techniques are described for automated satellite power management (ASPM) for a satellite communication system having a constellation of non-geosynchronous orbit (NGSO) small satellites (smallsats). The techniques can be resource-and/or mission-aware. Embodiments control power used by the constellation by evaluating subsets of the NGSO small-sats determined to be covering each of a number of grid regions (GRs) segmenting a coverage area at any particular timestep. For each timestep for each subset, the evaluating includes: determining whether any payloads of the subset are mutable payloads for the timestep (i.e., can be shut down to conserve power without violating mission objectives); and communicating with the subset to control power to the payloads, so that all the mutable payloads are muted for the timestep and all other payloads of the plurality of payloads are unmuted for the timestep.

20 Claims, 7 Drawing Sheets

600

700

705

Processor(s)
710

Input/Output Device(s)
715

Storage Device(s) 725

Ephemeris
Data 727

Subsciber
Data 728

PM Param.
Data 726

Communications
Subsystem
730

Working
Memory                    735

Operating
System
740

Application(s)
745

Payload
Manager
340

Smart
Scheduler
345

RESOURCE AND MISSION AWARE POWER MANAGEMENT FOR NON-GEOSYNCHRONOUS ORBIT SMALLSATS

BACKGROUND

Recent successful launches and deployments of smaller and cheaper non-geosynchronous orbit (NGSO) satellites, such as low-Earth orbit (LEO) satellites, have received attention from both governmental and commercial sectors. Some such deployments have reduced satellites to sizes comparable to that of a shoe box. As satellites are becoming smaller and lighter, it has become more economically viable to launch small payloads using light launch vehicles, such as space craft specially designed to launch so-called CubeSats, and/or other small satellites, into orbit. Although such size reductions tend to dramatically reduce costs associated with launching the satellites, the reduced size also yields technical constraints. For example, such satellites rely on their integrated power systems to provide sufficient electrical power distribution to support continuous high-performance data rate, to host service modules, to handle telemetry, tracking, and control (TT&C), to handle on-board data processing, and/or to provide other features. However, reducing the size, volume, and mass of the satellites tends to physically constrain the satellites'power systems, which tends also to reduce their electrical capability.

SUMMARY

Systems and methods are described herein for automated satellite power management (ASPM) for a satellite communication system having a constellation of non-geosynchronous orbit (NGSO) small satellites (smallsats). The techniques can be resource- and/or mission-aware. Embodiments control power used by the constellation by evaluating subsets of the NGSO smallsats determined to be covering each of a number of grid regions (GRs) segmenting a coverage area at any particular timestep. For each timestep for each subset, the evaluating includes: determining whether any payloads of the subset are mutable payloads for the timestep (i.e., can be shut down to conserve power without violating mission objectives); and communicating with the subset to control power to the payloads, so that all the mutable payloads are muted for the timestep and all other payloads of the plurality of payloads are unmuted for the timestep.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
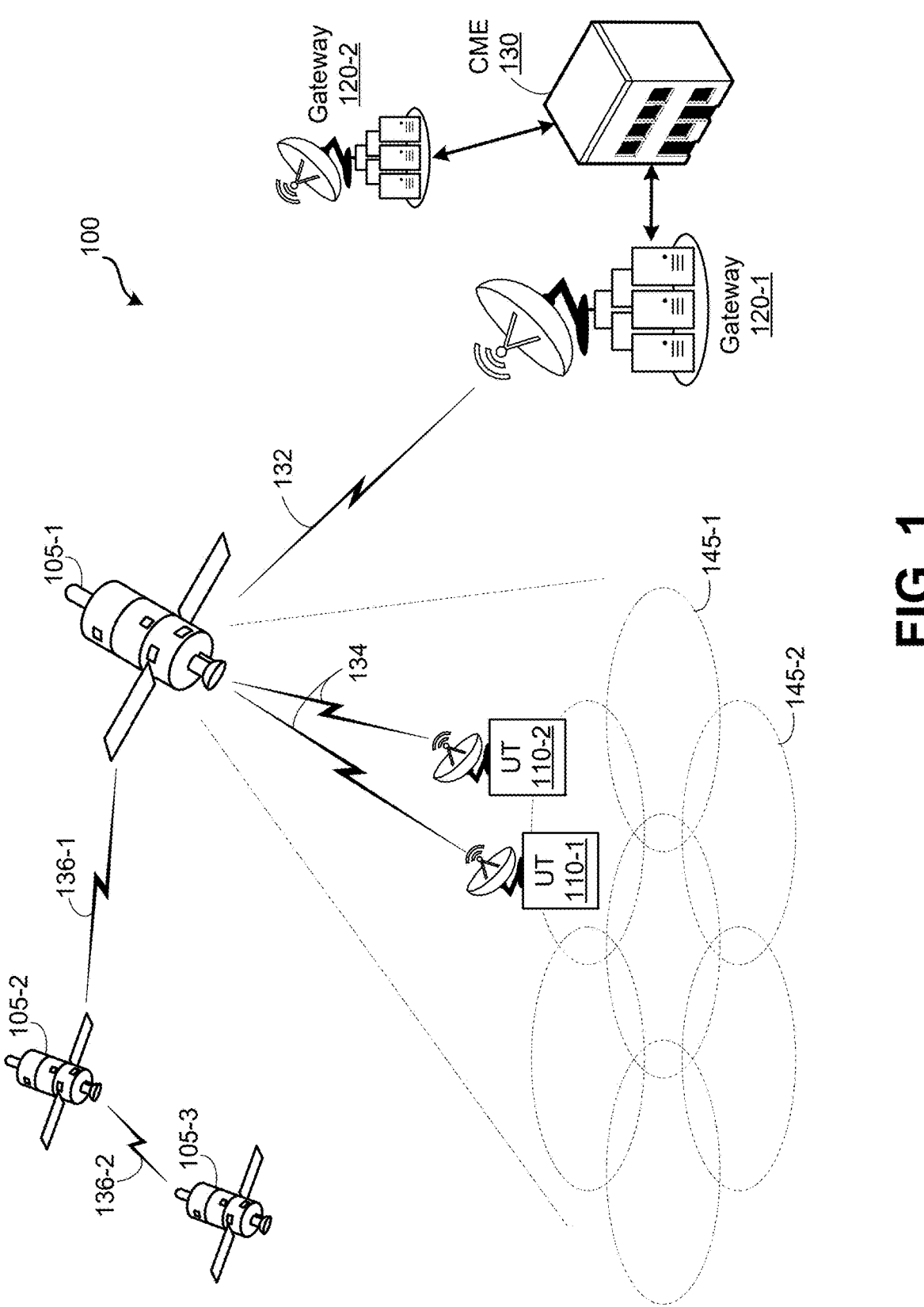
FIG. 1 shows an example of a satellite communication system with a constellation of non-geosynchronous orbit (NGSO) small satellites (smallsats) that supports embodiments described herein.

Recent successful launches and deployments of smaller and cheaper non-geosynchronous orbit (NGSO) satellites, such as low-Earth orbit (LEO) satellites, have received attention from both governmental and commercial sectors. Some such deployments have reduced satellites to sizes comparable to that of a shoe box. As satellites are becoming smaller and lighter, it has become more economically viable to launch small payloads using light launch vehicles, such as space craft specially designed to launch so-called CubeSats, and/or other small satellites, into orbit. For example, such launchers can have fairings designed to accommodate payloads from 150 to 1000 kilograms.

Although such advancements have dramatically reduced the cost of launching satellites, the reduced size of such satellites also yields certain technical constraints. For example, in many contexts, it is desirable to deploy satellites with payloads that can provide a continuous high-performance data rate, host service modules, handle telemetry, tracking, and command (TT&C), handle on-board data processing, and/or provide other features. These features rely on availability of power. However, reducing the size, volume, and mass of the satellites (e.g., to reduce the cost of launching the satellite) can limit the size, volume, and mass available for the satellites'power systems, which can reduce their electrical power distribution capability.

Further, as such NGSO satellites traverse their orbits, they tend to transition into and out of view of the sun. As the satellites'power systems are typically equipped with solar-rechargeable batteries, those batteries tend to undergo continuous charging and discharging events. As such, effective power design can involve ensuring that the batteries can handle what is essentially an on/off duty cycle in terms of charging capacity. For example, some present deployments are designed with a charging capacity that satisfies an approximate 40/60 on/off duty cycle. Thus, it can be desirable to design power systems for small NGSO satellites that provide sufficient power to the satellite within real-world constraints, such as strictly constrained size and an on/off charging duty cycle.

Embodiments described herein seek to provide resource- and mission-aware on-board power systems for small NGSO satellites that can support continuous and reliable coverage.

As such an NGSO satellite traverses its orbital path, it continuously moves between regions that are over land and over water (e.g., ocean), regions having high and low traffic, regions in which the sun is in view and eclipsed, etc. Movement through these regions dynamically impacts power supply to and/or demand from the satellite's on-board power system over time. Nonetheless, embodiments seek to manage the satellite on-board power systems in such a way that ensures continuous coverage over the entire orbital path(s) of the satellites. To that end, embodiments provide satellite power management (SPM) systems and methods that can determine timing and duration of changes in traffic demand and can coordinate power usage, accordingly, to meet stated capacity objectives within strict power constraints.

FIG. 1 shows an example of a satellite communication system 100 with a constellation of non-geosynchronous orbit (NGSO) small satellites (smallsats) that supports embodiments described herein. As illustrated, the satellite communication system 100 includes one or more gateway terminals 120 in communication with a large number of geographically diverse user terminals (UTs) 110 via the constellation of NGSO smallsats 105. The UTs 110 are located in cells 145. The gateway terminals 120 are further in communication with a central management entity (CME) 130 via a terrestrial infrastructure. Such a satellite communication system 100 can be designed to provide high-speed, high-reliability global coverage, enabling communication services such as broadband internet and telephony across geographically dispersed cells, even in remote areas where terrestrial network infrastructure is minimal or absent.

The constellation of NGSO smallsats 105 can include any smallsats that operate in orbits that are not geostationary (i.e., the smallsats move relative to the Earth's surface). The term "smallsats" (or "small satellites") is used here in to broadly encompass a variety of NGSO satellites having size constraints that limit their ability to provide sufficient power to support all its operational features. For example, NGSO smallsats can include femtosatellites typically weighing less than 100 grams, picosatellites typically weighing between 100 grams and 1 kilogram, nanosatellites typically weighing between 1 and 10 kilograms, microsatellites typically weighing between 10 and 100 kilograms, and minisatellites typically weighing between 100 and 500 kilograms. As one common example, so-called "CubeSats" are a type of nanosatellite with a standard CubeSat unit (1 U) defined as a 10 cm cube with a mass up to 1.33 kilograms.

The NGSO smallsats 105 can be placed in low Earth orbit (LEO), medium Earth orbit (MEO), or highly elliptical orbit (HEO), each offering different trade-offs in terms of coverage, latency, and data throughput. LEO satellites typically operate between 160 to 2,000 kilometers above the Earth, providing low-latency communication but requiring a large number of satellites for continuous global coverage. MEO satellites typically operate between 2,000 and 35,786 kilometers above the Earth, such that fewer satellites can provide global coverage, but at the cost of higher latency. Further, MEO satellites typically rely on higher power amplifiers and use more power to close their link relative to LEO satellites. HEO satellites have elliptical orbits designed to provide long dwell times over particular (e.g., high latitude) regions, such as for specialized coverage needs.

The NGSO smallsats 105 can be in communication with the gateway terminals 120 via feeder links 132. The NGSO smallsats 105 can also be in communication with each other via inter-satellite links (ISLs) 136. For example, the ISLs 136 can include optical links that provide direct communications from one of the NGSO smallsats 105 to one or more adjacent NGSO smallsats 105 in the same orbital plane and/or to one or more NGSO smallsats 105 in adjacent orbital planes. The constellation can be designed to ensure globally uninterrupted communication links.

Figure 2:
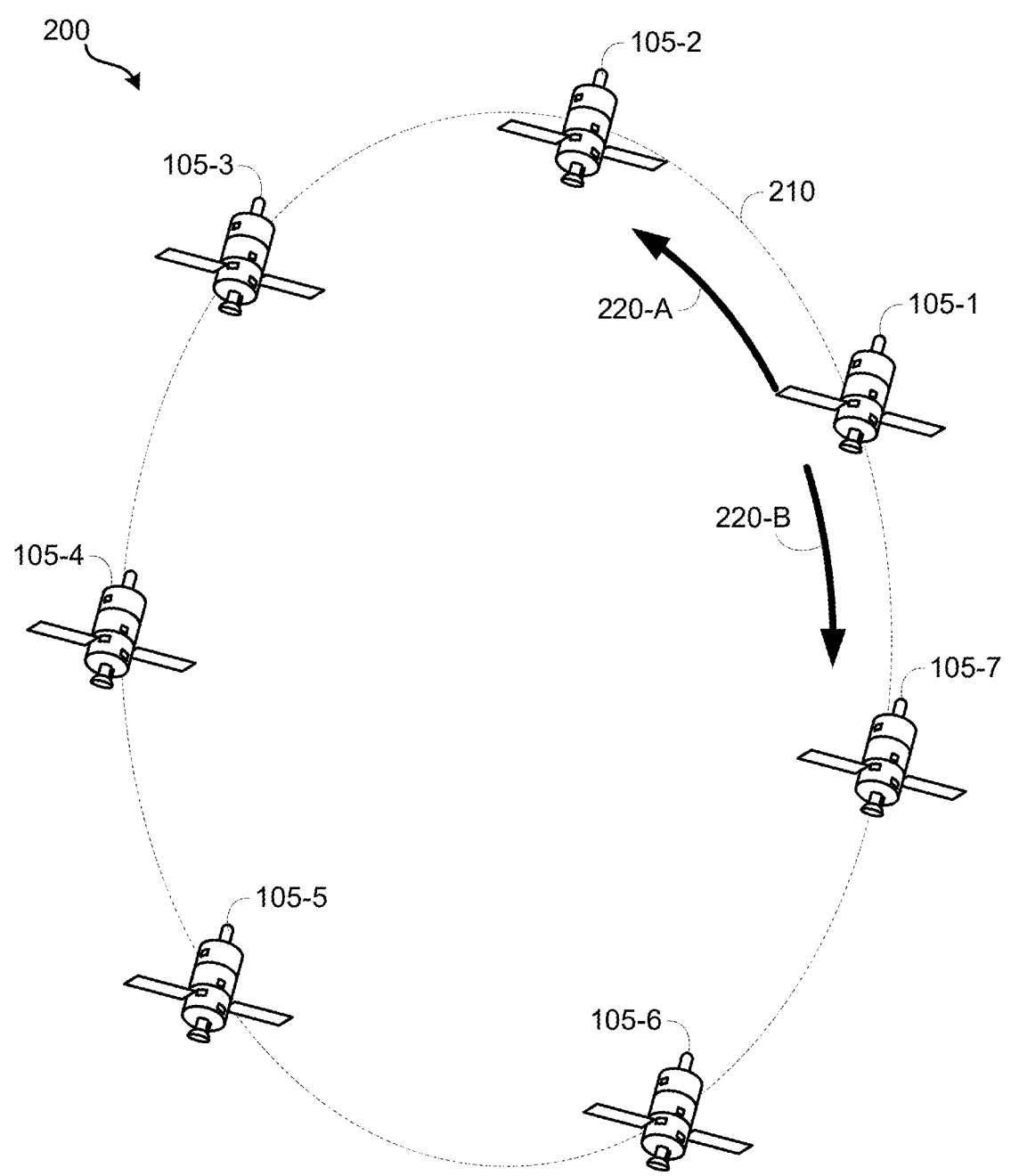
FIG. 2 shows an example orbital configuration for a constellation of NGSO smallsats.

Turning briefly to FIG. 2, an example orbital configuration 200 is shown for a constellation of NGSO smallsats 105. In general, embodiments herein assume a constellation of M orbits (M is a positive integer) of N satellites per orbit (N is an integer greater than 1). In implementations having multiple orbits (i.e., M>1), the orbits are in different orbital planes. The orbital configuration 200 shows a single orbit (e.g., either M=1, or the illustrated orbit represents one of multiple orbits). The illustrated orbital configuration 200 includes seven NGSO smallsats 105 following a same orbital path 210. Each NGSO smallsat 105 can communicate with the NGSO smallsat 105 directly ahead of it along the orbital path 210 via an ISL path 220 (e.g., arrow 220-A) and/or with the NGSO smallsat 105 directly behind it along the orbital path 210 via an ISL path 220 (e.g., arrow 220-B).

Returning to FIG. 1, the UTs 110 are the endpoints of the satellite communication system 100, enabling end-users to access the network services provided via the satellite constellation. UTs can vary widely in terms of size, complexity, and functionality, ranging from handheld devices to fixed installations (i.e., the UTs 110 can include fixed and/or mobility terminals). Some options for UTs 110 include mobile phones, satellite phones, personal and portable internet devices, and devices coupled with fixed satellite dishes. As used herein, the UTs 110 can also include ground vehicle terminals (i.e., terminals integrated with and/or located in ground vehicles, such as automobiles, trains, etc.), aero terminals (i.e., terminals integrated with and/or located in aircraft, such as airplanes, floating platform systems, aerial drones, etc.), nautical terminals (i.e., terminals integrated with and/or located in cruise ships, oversea transport vessels, etc.), etc.

Each UT 110 can include any feasible components for establishing user link 134 communications with the NGSO smallsats 105. For example, UTs 110 include at least a satellite antenna and a modem capable of modulating and demodulating satellite signals. As illustrated, the UTs 110 can be distributed across geographically dispersed cells 145, with the cell size and the number of UTs 110 per cell depending on the specific application and the capacity of the satellite communication system 100.

The gateway terminals 120 serve as intermediary nodes between the constellation of NGSO smallsats 105 and one or more data networks (e.g., the Internet). The gateway terminals 120 can be equipped with high-gain satellite antennas for efficient feeder link 132 communications with the NGSO smallsats 105 and can be connected to the terrestrial network infrastructure via high-bandwidth links (e.g., fiberoptic cables, microwave links, or other high-speed communication technologies). The gateway terminals 120 can provide several features, such as signal amplification, frequency conversion, and routing of data to and from the satellite network.

As illustrated, the gateway terminals 120 can be in communication with a central management entity (CME) 130. The CME 130 can be responsible for centralized management and control of features of the satellite communication system 100, such as satellite operation, network configuration, and resource allocation. For example, the CME 130 can monitor the health and status of the satellite constellation, manage the network's traffic load, and help to ensure high levels of performance and service quality. Some implementations of CMEs 130 further coordinate network operation, such as by scheduling satellite handovers, managing allocation of bandwidth among users, enforcing security measures, etc. Features of the NGSO smallsats 105, gateway terminals 120, and CME 130 are described further below.

In such a satellite communication system 100, the supply of resources to the NGSO smallsats 105 and the demand for resources from the NGSO smallsats 105 can be highly dynamic over time and space due to several factors, such as changing user traffic demand over time; movement of mobile UTs 110; constant movement of the NGSO smallsats 105 relative to the Earth's surface, and thereby relative to cells 145, UTs 110, and gateway terminals 120; and periodic transitioning of the NGSO smallsats 105 between sunlit and eclipse phases of their orbits. For example, as any particular NGSO smallsat 105 traverses its orbit, it can spend considerable time over large bodies of water (e.g., oceans), large mountainous regions, polar regions, and/or other regions that tend to have a relatively small number of UTs 110 as compared to populated over-land regions; thereby experiencing large fluctuations in demand for its bandwidth resources. Further, different topologies can impact line-of-sight between locations on the Earth's surface and NGSO smallsats 105 of the constellation, such that UTs 110 in some locations can easily see multiple NGSO smallsats 105 without blocking, while UTs 110 in other locations (e.g., in regions with dense foliage, mountains, tall buildings, etc.) may have struggle to obtain and/or maintain line-of-sight to NGSO smallsats 105. For example, blockages are more prominent or tend to happen more often when the elevation angle is small and/or the nadir angle is large. Often, urban regions with relatively high bandwidth demand can also experience a higher probability of encountering blockage situations. Additional conditions, such as rain fades and other weather events can also cause blockages and/or otherwise impact satellite resource supply and/or demand (e.g., more robust modulation and/or coding schemes may be used in such conditions to maintain reliable communications, which can reduce the efficiency of the communications).

Addressing such dynamic concerns can involve architecting the satellite communication system 100 to have certain numbers of orbits, certain numbers of NGSO smallsats 105 per orbit, certain orbital altitudes, certain numbers and locations of gateway terminals 120, and/or other features. These and other architectural determinations (both at the constellation level and at the satellite level) can also impact and/or be impacted by power decisions. As one example, increasing the number of orbits and/or NGSO smallsats 105 within those orbits can affect the constellation's geometry and, consequently, the communication architecture. A denser constellation may reduce the need for high-power transmissions between individual satellites and user or gateway terminals, as the distance for such communications decreases. However, more satellites can also increase overall system complexity, potentially involving more power for onboard processing, inter-satellite links, etc.

As another example, lower orbital altitudes reduce the distance to Earth, which can decrease the power required for communication with ground stations and user terminals. However, satellites in lower orbits can experience more frequent eclipse periods, increasing the amount of time during which they are not able to obtain solar power. As another example, power used for communications can be reduced by reducing communication distances (e.g., by strategically placing of gateway terminals 120 and/or distributing more gateway terminals 120 globally) and/or by reducing the communication load of each satellite (e.g., by serving a smaller number of user terminals per satellite and/or managing less extensive data transmission tasks).

Other design factors can impact satellite power supply and demand, such as selecting orbital parameters that reduce the demands on a satellite's thermal management system, determining whether to employ (e.g., and when and how to use) ISLs 136, determining what to include in a satellite's payload (e.g., inclusion of imaging systems, sensors, communication transponders, etc.) and/or the resulting processing capabilities of the payload, designing power components (e.g., satellite bus, batteries, solar panels, etc.), determining how much redundancy and/or fault tolerance to include, determining how to distribute data processing between satellites and ground station networks, determining whether to include propulsion systems for orbital maintenance and maneuvering, and determining mission duration.

Embodiments described herein provide a novel approach to power management in these contexts. The novel approaches can manage power in NGSO smallsats 105 using a combination of static and dynamic autonomous techniques that are both the energy resource aware and mission aware. Embodiments include a feedback process to support autonomous management.

As described herein, embodiments deploy multiple smart schedulers, including one hosted in the ground segment and another on-board the NGSO smallsats 105 to actively and reactively trigger scheduling of several kinds to help in power conservation. This can extend the mission of the NGSO smallsats 105, while supporting high-performance data communication. The terms "energy" and "power" are used loosely and interchangeably herein.

NGSO smallsats 105 typically operate on photovoltaic power in combination with one or more power storage devices (e.g., batteries). As described herein, the NGSO smallsats 105 traverse an orbit that includes a sunlit phase (when the NGSO smallsat 105 is not in the Earth's shadow) and an eclipse phase (when the NGSO smallsat 105 is in the Earth's shadow). Solar panels or arrays are considered as the primary source for providing power to subsystems of the NGSO smallsat 105 and also for recharging the power storage devices during each orbital sunlit phase. The power storage devices are considered as the secondary source for providing power during each orbital eclipse phase. Over time, due to aging, power system components (e.g., solar panels and batteries) tend to degrade, and storage capacities, conversion efficiencies, charging rates, and other characteristics can be affected. As such, these components tend to be sized conservatively to meet their predicted end of life (EOL) conditions as part of static planning. Embodiments of power management approaches described herein can tend to increase the EOL so that services can be provided by the satellites for more time than statically planned.

Eclipses are common occurrences that can affect charging of the power storage devices. For example, a typical LEO smallsat may take around 100 minutes to traverse one orbit around the Earth, and the satellite may be in eclipse phase for up to around 40 minutes of that orbit (e.g., depending on factors, such as orbital altitude, season, etc.). In the eclipse phase, the satellite does not receive any solar power and relies instead on power from the power storage devices. Thus, the power storage devices may have around 60 minutes in each orbit to be recharged with enough solar energy (during the sunlit phase) so that they are able to power the NGSO smallsat 105 subsystems during the other 40 minutes of the orbit (during the eclipse phase).

Typically, more ambitious mission objectives can include high data intensive operations with continuous coverage over lands and oceans, and such objectives tend to involve higher demand for power. For example, there tends to be a direct relationship between the desired data rate and the power needed to maintain a given bit error rate. Some conventional approaches seek to increase power with increased solar panel surface area, larger power storage devices, or the like. Although such approaches will provide increased energy generation and/or capacity, they also tend to increase the physical size and/or mass of the satellite. Some other conventional approaches rely on using highly efficient components, which may be technically and/or commercially impractical in high-performance contexts. Some other conventional approaches attempt to adapt power management research and techniques from ground-based systems (e.g., laptops, cellular phones, etc.) to the satellite context. However, several differences between ground-based and satellite contexts tend to frustrate those attempts. For example, in ground-based systems, users typically have continuous or near continuous access to the system, interactively generate the workload demands, and control the frequency of battery charging cycles. In contrast, once launched a deployed satellite will typically carry out its mission without any direct user access, interaction, or control (except via remote systems).

To date, power management approaches in the satellite domain tend to utilize relatively little or no autonomous intelligence. Operators rely mainly on experience to determine desired scheduling. For example, simple threshold-based strategies are configured on-board to maintain predetermined operating conditions that do not include any true prediction of resource consumption or knowledge of payload usage. Such conventional approaches are neither resource-aware, mission-aware, nor autonomous. Ultimately, such conventional approaches tend only to be capable of producing satellites with enough power capability to support limited satellite subsystem and communication capabilities. Such limits are continuing to be pushed, and even crossed, by advancements in satellite payload technologies, such as continuing increases in demand for high-bitrate communications that demand larger amounts of satellite power.

Embodiments described herein can provide NGSO smallsats 105 with power management that is resource-aware, mission-aware, and autonomous. Such embodiments can include smart mission and resource schedulers implemented to meet telecommunication requirements of a mission with highly efficient utilization of power from both primary and secondary power sources. Such embodiments are further designed to operate within strict size, volume, and mass constraints of NGSO smallsats 105 with a goal of high data transmission rates and capacities. In general, embodiments seek to determine locations and times during which transmissions and payloads if one or more NGSO smallsats 105 of the constellation can be "muted" (e.g., paused, not used, turned off, etc.), such that overall power requirements are reduced without sacrificing mission objectives. Combinations of static and dynamic techniques are provided with the incarnation of multiple smart schedulers running at different places of the system to identify times and places when transmission and payloads can be muted without losing coverage requirements.

Figure 3:
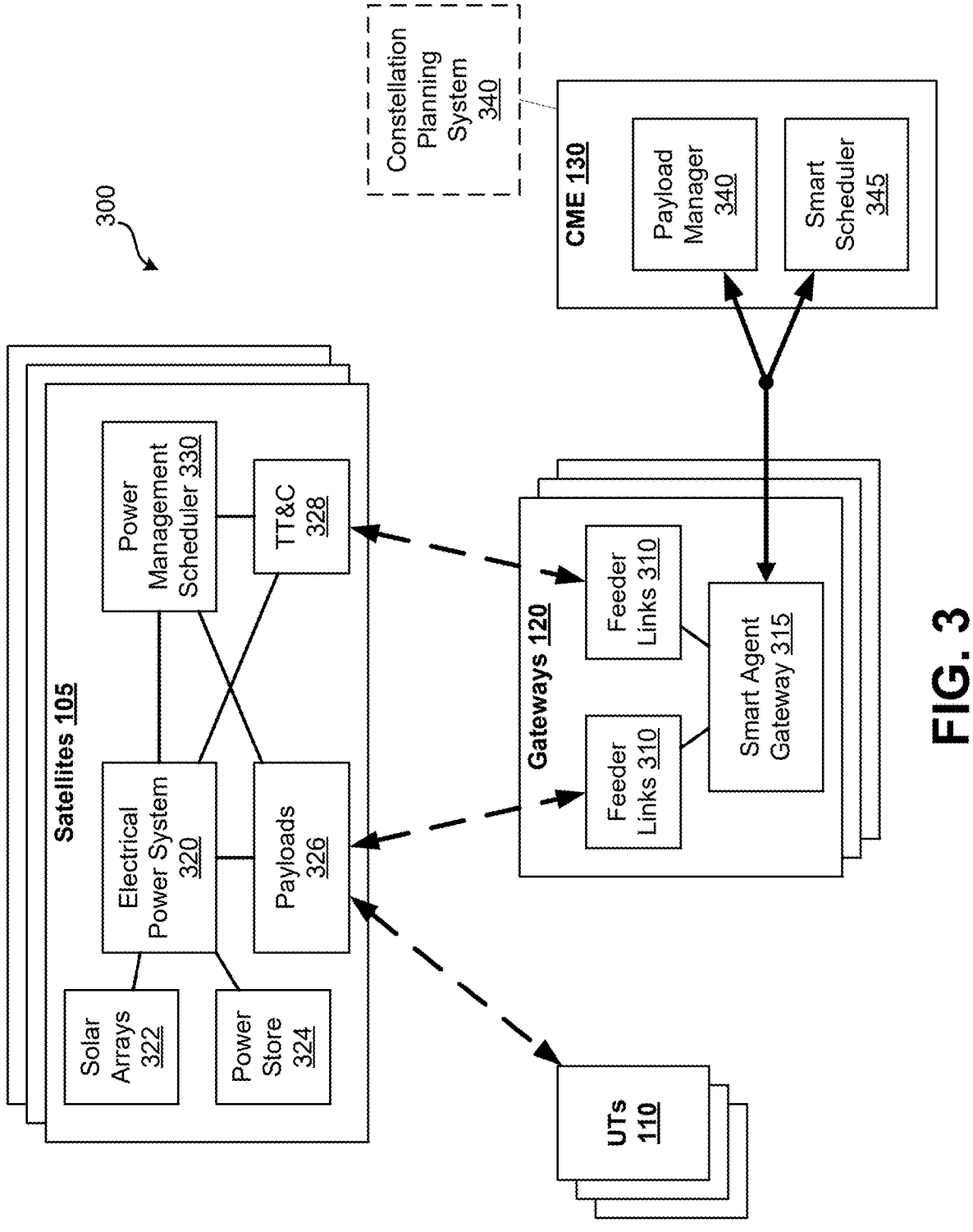
FIG. 3 shows a system block diagram of a satellite communication system for providing resource-aware and mission-aware power management for a constellation of NGSO smallsats, according to embodiments described herein.

FIG. 3 shows a system block diagram of a satellite communication system 300 for providing resource-aware and mission-aware power management for a constellation of NGSO smallsats 105, according to embodiments described herein. The satellite communication system 300 can be an implementation of the satellite communication system 100 of FIG. 1. As illustrated, the satellite communication system 300 includes gateway terminals 120 in communication with UTs 110 via a constellation of NGSO smallsats 105. The gateway terminals 120 are further in communication with a CME 130.

Numbers and locations of gateway terminals 120 can be determined based on mission objectives defined for the satellite communication system 300. Each gateway terminal 120 establishes feeder links 310 with the NGSO smallsats 105. The term "feeder link" typically refers to the wireless communication channel between an NGSO smallsat 105 and a gateway terminal 120. The representation of feeder links in FIG. 3 as blocks of the gateway terminals 120 is intended to generally suggest any components of the gateway terminals 120 that are used to facilitate feeder-link communications. For example, the feeder link 310 block can include some or all of a parabolic reflector antenna, low-noise block down-converter (LNB), block upconverter (BUC), solid-state power amplifier (SSPA), frequency converter, intermediate frequency (IF) processor, baseband processor, modulator, demodulator, high-speed digital signal processor (DSP), error correction encoder/decoder, beacon receiver, reference oscillator, network management system (NMS) hardware, cryptographic equipment, and/or any other suitable components.

Some or all of the gateway terminals 120 further include a smart agent gateway 315. Embodiments of the smart agent gateway 315 can perform various features, such as managing data flows, optimizing network performance, dynamic resource allocation, network security, and/or other features to facilitate implementing wide (e.g., global) broadband coverage via the constellation of NGSO smallsats 105. As illustrated, the smart agent gateway 315 in each gateway terminal 120 can communicate with the CME 130.

Embodiments of the CME 130 include a payload manager 340 and a smart scheduler 345. Embodiments of the payload manager 340 oversee functionality and operations of the payloads of the NGSO smallsats 105. These payloads are the primary instruments through which the satellites fulfill their communication mission, including transponders, antennas, and processors that facilitate data transmission and reception. The payload manager 340 can monitor the health and status of these payload components, manage resource allocation (such as power and bandwidth) among them, adjusting operational parameters to maintain or enhance performance, etc. For example, such features can involve tasks, like modifying communication frequencies to adhere to regulatory requirements and optimizing power distribution among transponders to improve link quality under varying operational conditions. The payload manager 340 can also schedule activities of the satellite payloads based on the satellite's orbital dynamics, overarching network requirements, specific demands of end-users, and/or other factors, seeking to ensure that the satellite's resources are employed effectively to address diverse communication needs efficiently. The payload manager 340 is typically largely responsible for long-term operational planning for the satellite constellation, which can involve orchestrating software updates, strategizing for adjustments due to shifts in market demands or technological evolution, and ensuring compliance with international satellite communication regulations and standards.

Embodiments of the smart scheduler 345 determine when to mute and unmute specific payloads and/or spot beams of NGSO smallsats 105. The smart scheduler 345 can also provide the NGSO smallsats 105 with feedback for learning-based scheduling tasks that are executed on board to make the mission more efficient. Although the smart scheduler 345 is shown as a block of the CME 130, features of the smart scheduler 345 can be distributed between the smart scheduler 345 block of the CME 130 and by the smart agent gateway 315 shown as part of the gateway terminals 120. For example, certain smart scheduler 345 features are centralized in the CME 130, and other features are distributed and moved closed to the feeder links by being implemented in the gateway terminals 120.

The gateway terminals 120 and the CME 130 can be referred to as part of the ground segment of the satellite communication system 300. The ground segment can also be considered as including the UTs 110. As described with reference to FIG. 1, the UTs 110 communicate with the NGSO smallsats 105 via user links, and the gateway terminals 120 communicate with the NGSO smallsats 105 via feeder links. For example, a UT 110 uplinks data to an NGSO smallsat 105 payload via a user link (a return user uplink), which downlinks the data to a gateway terminal 120 via a feeder link (a return feeder downlink). Conversely, a satellite gateway 120 uplinks data to an NGSO smallsat 105 payload via a feeder link (a forward feeder uplink), which downlinks the data to multiple UTs 110 via multiple user links (forward user downlinks).

The space segment of the satellite communication system 300 is the constellation of NGSO smallsats 105. As described above, the NGSO smallsats 105 can be traversing one or more orbits in one or more orbital planes. As illustrated, each NGSO smallsat 105 can include solar panel arrays 322, a power store 324, an electrical power system (EPS) 320, payloads 326, a TT&C module 328, and a power management scheduler 330. The payloads 326 can include both payloads that communicate with the ground segment and payloads that provide inter-satellite communications. As described above, the solar panel arrays 322 and the power store 324 act as the primary and secondary power sources, respectively, for the NGSO smallsat 105. The solar panel arrays 322 convert solar energy to electrical power, such that the solar panel arrays 322 are the power source for the NGSO smallsat 105 during the sunlit phase of each orbit. Whenever the solar panel arrays 322 are receiving solar energy, they are generating power both for powering components (e.g., functional blocks, subsystems, etc.) of the NGSO smallsat 105 and for recharging the power store 324. The power store 324 can include any feasible rechargeable power storage components, such as lithium-ion batteries, nickel-cadmium batteries, nickel-metal-hydride batteries, lithium-polymer batteries, solid-state batteries, supercapacitors, etc. The power store 324 provides power to the NGSO smallsat 105 during the eclipse phase of each orbit.

Embodiments of the EPS 320 are electrically coupled with the solar panel arrays 322 and the power store 324 and operate to distribute power to operating components of the NGSO smallsat 105, including to the payloads 326, the TT&C module 328, and the power management scheduler 330. The payloads 326 can include any components for facilitating the satellite side of feeder-link and user-link communications. For a bent-pipe type of NGSO smallsat 105, the payloads 326 can include transponders, low-noise amplifiers (LNAs), high-power amplifiers (HPAs), antennas (both user-link and feeder-link specific), filters, frequency converters (up/down converters), beamforming networks, and/or any other feasible components for facilitating user-link and feeder-link communications. For a regenerative type of NGSO smallsat 105, the payloads 326 can include on-board processors, antennas (user-link and feeder-link specific), transponders, low-noise amplifiers (LNAs), high-power amplifiers (HPAs), filters, frequency converters (up/down converters), digital signal processors, modulation/demodulation units, error correction encoders/decoders, and/or any other feasible components for facilitating user-link and feeder-link communications.

A single NGSO smallsats 105 can include multiple payloads 326, as described below. Each NGSO smallsat 105 can also engage in multiple types of communications. As described herein, the NGSO smallsat 105 can communicate with the ground segment, including communicating data communications with UTs 110 via user links, data communications with gateway terminals 120 via feeder links, and TT&C communications with gateway terminals 120 via TT&C links. In some embodiments, though not explicitly shown in FIG. 3, the NGSO smallsat 105 can communicate with other NGSO smallsats 105 in the space segment via ISLs. All these communications can be bidirectional. The TT&C link typically carries a relatively small amount of data for control and management, which can use less power.

Embodiments of the telemetry, tracking, and command (TT&C) module 328 facilitate communications between the NGSO smallsat 105 and ground control stations, such as the gateway terminals 120. Telemetry features can generally include collecting data about the satellite's operational status and health (e.g., power levels, thermal conditions, onboard systems status, etc.) and transmitting the data back to the ground stations to allow operators to monitor the satellite's condition and performance continuously. Tracking features can generally include determining the precise orbit and position in space of the NGSO smallsat 105, such as by using a combination of onboard systems and ground-based tracking, to ensure that the NGSO smallsat 105 maintains its intended orbit and orientation. Command features can generally allow ground-based operators to send instructions to the NGSO smallsat 105, such as to adjust the orbit, orientation, and/or operational parameters of its payloads; to turn on or off specific components; to initiate software updates; to change the configuration of the satellite to respond to changing mission requirements; etc.

Embodiments of the power management scheduler 330 control power management by implementing scheduling logic as to when components of the NGSO smallsat 105 can be muted for power saving. The power management scheduler 330 can be responsive to control directives received from the smart scheduler 345 and/or the smart agent gateway 315. The power management scheduler 330 can be implemented using any suitable onboard component, such as one or more microprocessors, field-programmable gate arrays (FPGAs), microcontrollers, application-specific integrated circuits (ASICs), digital signal processors (DSPs), system-on-a-chip (SoC) devices, programmable logic devices (PLDs), embedded computers, and/or single-board computers (SBCs). In some embodiments, the power management scheduler 330 is designed to operate in a mostly passive manner to reduce the complexity of its algorithms and to reduce power resource consumption, accordingly.

As described herein, the power management scheduler 330 and the smart scheduler 345 (e.g., extended to include features of the smart agent gateway 315) implement resource- and mission-aware power management for the NGSO smallsats 105. To that end, it is instructive to consider the orbital motion of each NGSO smallsat 105. At different orbital locations (e.g., locations and times along the orbital path), the NGSO smallsat 105 can have an associated one or more coverage areas, which can be known a priori to the smart scheduler 345. The coverage areas can, at different ones of these orbital locations, correspond to regions of land masses, large bodies of water, polar regions (e.g., depending on the orbital plane), etc. Each orbital point can also correspond to different supply of and/or demand for satellite resources (referred to herein as a present satellite resource availability, or present SRA).

Thus, the present SRA for an NGSO smallsat 105 can be different at different orbital points. Further, the present SRA at each orbital point can be different for and/or from different angles, thereby increasing the dimensionality of SRA determinations. The present SRA at each orbital point can also vary over time, such as based on a local time of day, a local day of the week, a local season, etc., thereby further increasing the dimensionality of SRA determinations. Each present SRA can be based on several factors. Some such factors are static, either throughout an entire orbital cycle (sometimes referred to as an orbital "day", or the like) or over certain pre-determined portions of each orbital cycle. In general, these static factors can be determined (e.g., computed) a priori. Other factors can be dynamic, such that they vary continuously, or substantially continuously. Some such dynamic factors are unpredictable, although others may be partially or completely predictable.

Figure 4:
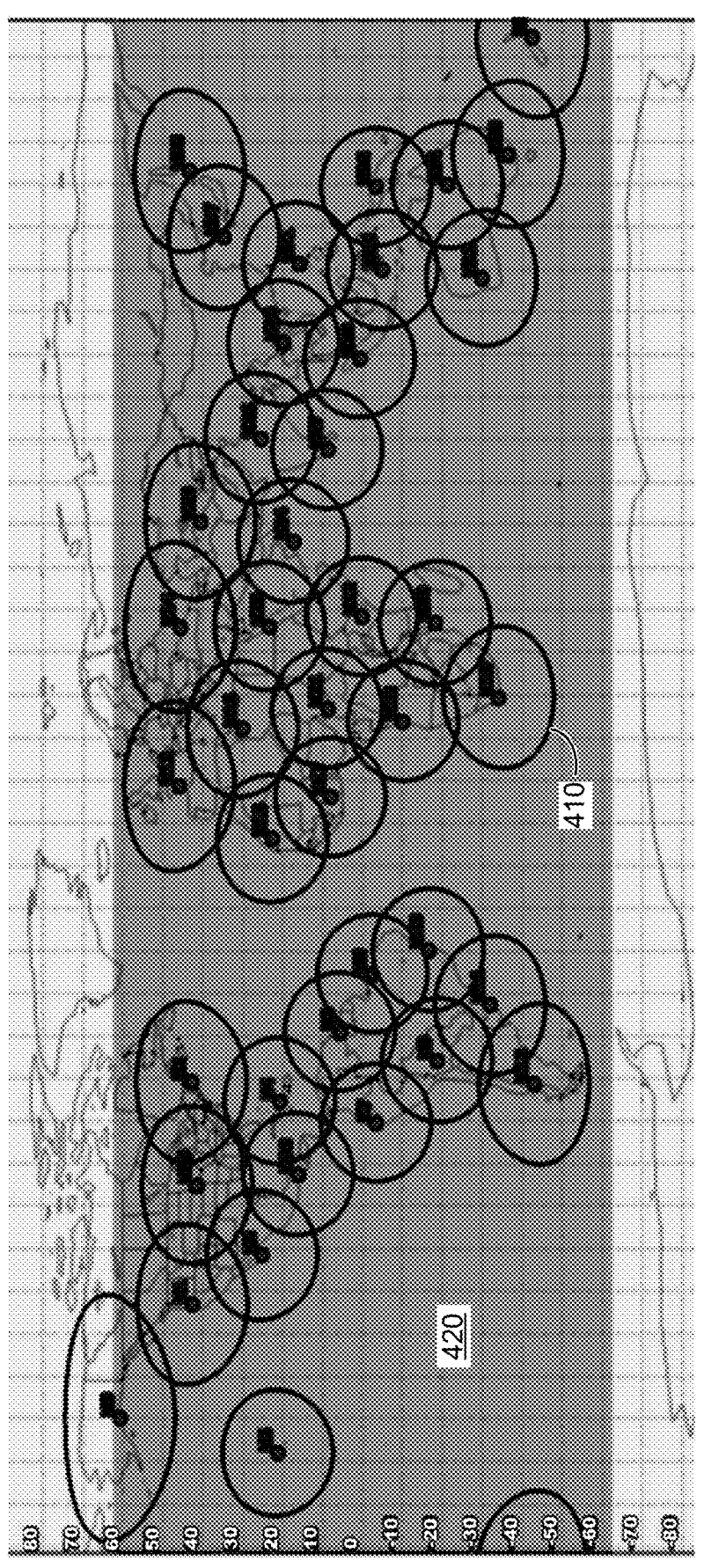
FIG. 4 shows an example coverage map for an illustrative satellite communication system.

For the sake of added context, FIG. 4 shows an example coverage map 400 for an illustrative satellite communication system. As illustrated, the system provides substantially global coverage. For example, the system can include NGSO smallsats with ISLs. In the illustrated system, dark circles represent illustrative gateway terminal coverage areas 410. For example, forty-one geographically distributed gateway terminals are deployed. Such a configuration can provide a global coverage area 420 without any service gaps between 64 degrees north and 64 degrees south latitude, assuming minimum elevation angle (MEA) for all user terminals of 20 degrees. Allowing for a lower MEA (e.g., 15 degrees) can extend coverage up to 78 degrees latitude, which can cover northern portions of Alaska and other regions. As used herein, the phrase "global coverage" (or the global coverage area 420) is not intended to mean that every inch of the globe is covered; rather, that substantially all populated regions on Earth are covered, assuming practical constraints on MEAs, antenna sizes, link budgets, transmit power, etc.

The coverage map 400 demonstrates that, when traversing an orbital path over such a configuration, any particular NGSO smallsat will tend to fly over some regions covered by one gateway terminal, some regions covered by multiple gateways, and some regions covered by no gateways (e.g., it may not be practical to deploy a gateway terminal in the middle of the ocean). Conversely, as the constellation of NGSO smallsats follows its orbit(s), there are times when any gateway terminal may be in line of sight of only one of the NGSO smallsats, with multiple of the NGSO smallsats, or with none of the NGSO smallsats. From a user link perspective, when traversing an orbital path over such a configuration, any particular NGSO smallsat will tend to fly over some regions with relatively few user terminals, some regions with large numbers of user terminals, and some regions with no user terminals. Conversely, as the constellation of NGSO smallsats follows its orbit(s), there are times when any user terminal may be in line of sight of only one of the NGSO smallsats, or with multiple of the NGSO smallsats.

The illustrated configuration assumes that the global coverage area 420 is without service interruptions, so that any user terminal within the global coverage area 420 is always in line of sight (within its MEA) of at least one of the NGSO smallsats (not accounting for mobile terminals, such as a user terminal in a car or train, which may pass through tunnels and/or other regions in which line of sight is unavailable). Other configurations can be designed not to provide global coverage, and/or to allow for certain service interruptions due to user terminals experiencing certain times when they are not in line of sight of any NGSO smallsats. The illustrated configuration further assumes that the global coverage area 420 is achieved at least in part by exploiting ISLs. For example, direct communication between NGSO smallsats via ISLs can be used to maintain continuous coverage even when one or more NGSO smallsats of the constellation does not have a feeder-link connection, such as when it is not over a gateway terminal coverage area 810, and/or when one or more gateway terminals fails.

Embodiments described herein can divide the coverage area of each NGSO smallsat over its orbital cycle into multiple grid regions (GRs). In each GR, embodiments evaluate static and dynamic SRA factors to compute an estimated power demand for the GR based on estimating power consumption for the GR. In some embodiments, overlapping GRs from multiple NGSO smallsats are evaluated in aggregate to compute estimated power demand by accounting for capabilities, such as capacity distribution among multiple NGSO smallsats that may be concurrently visible to a same cell and/or gateway terminal and/or which may be available via ISLs. Some embodiments can compute estimated power demand to further account for certain failure modes, such as by adding a margin to help satisfy unexpected surges in demand. Embodiments use the grid-based estimated power demand computations, along with smart logic, to determine where and when payloads can be turned on or off. For example, embodiments can operate to find a solution for the whole constellation that satisfies the estimated power demand for all GRs with the least satellite power consumption (e.g., per NGSO smallsat, in aggregate over the constellation, etc.).

Returning to FIG. 3, as illustrated, the power delivery capability of an NGSO smallsat 105 is based on capabilities of a primary power subsystem (solar panels arrays 322) and a secondary power subsystem (power store 324, such as batteries). The primary source of energy converts solar radiant energy into electrical power during sun availability periods (in the sunlit phase of each orbit). The secondary energy source stores energy and distributes electrical power to the various subsystems and payloads of NGSO smallsat 105 for the time when the primary energy source is not available (during the eclipse phase of each orbit). Power management embodiments described herein account for both the primary and secondary power subsystems.

Both the solar panel arrays 322 and power store 324 tend to degrade over time. For example, solar panel arrays 322 can degrade due to eclipse conditions, and power storage devices of the power store 324 can degrade due to multiple charging and discharging cycles. Such degradation over time can be estimated and can be accounted for when determining the end of life (EOL) of an NGSO smallsat 105 at the time of planning.

In some embodiments, a constellation planning system 340 (e.g., implemented in a global resource manager, GRM) is located at a central management location. The constellation planning system 340 coarsely predicts the communication usage of the NGSO smallsats 105 plus telemetry operations for the NGSO smallsats 105. The constellation planning system 340 can be provided with orbital parameters for each NGSO smallsat 105, from which it can derive the timing and duration of the sunlit phase(s) and eclipse phase(s) of in each orbital period for each NGSO smallsat 105. It also predicts occurrences of a shadowing effect, which can occur when the sun, an NGSO smallsat 105, and a gateway terminal 120 align in one line. Based on mission objectives for the constellation(s) (e.g., duration, traffic capacity, etc.), the constellation planning system 340 can determine the design and size of the solar panel arrays 322 and capacities of the power store 324. It can be desirable to reduce costs of the components and launch, which can involve decreasing size, volume, and mass of the NGSO smallsats 105 and their power components. Some embodiments seek a design of the solar panel arrays 322 and the capacity of power store 324 that strikes an optimum balance (or as optimal as practical) between cost and communication efficiency. Such design choices can ultimately determine the expected lifetime of the solar panel arrays 322 and power store 324, and thus the mission.

The EOL determination is typically a static determination, and it tends to be a coarse and conservative prediction at the time of planning. Dynamic power management approaches described herein can tend to increase the static predicted EOL by implementing resource- and mission-aware management, which operates after the launching of the NGSO smallsats 105. Optimizations at the planning stage can be performed based on alternative goals, such as designing orbits of the NGSO smallsat 105 constellations to maximize a mission life. For example, the orbital plane(s) and inclination(s) can be chosen with the knowledge of expected coverage areas and also to minimize eclipse periods. Further increases in solar energy generation can consider factors, such as adjusting orbital plane(s) and inclination(s) to maximize the time in which the sun's cosmic rays are substantially normal to planes of the solar panel arrays 322.

Once the constellation is designed and the NGSO smallsats 105 are launched, an automated (or at least partially automated) satellite power management (ASPM) scheme can be employed. Some ASPM schemes are based on a static, predetermined schedule. As described above, orbital paths can be segmented into GRs. For each GR, a static determination can be made as to whether particular subsystems of one or more NGSO smallsats 105 can be muted without reducing system performance below a mission objective performance threshold (e.g., without causing system interrupts, without reducing bandwidth or throughput below a predetermined minimum level, etc.). In some implementations, for each GR for each NGSO smallsat 105, the ASPM scheme can designate whether the NGSO smallsat 105 as a whole is switched into a low-power mode (e.g., idle mode, standby mode, sleep mode, etc.). In other implementations, for each GR for each NGSO smallsat 105, the ASPM scheme can designate which of several subsystems of the NGSO smallsat 105 are muted or unmuted. For example, such an ASPM scheme can individually mute or unmute payloads 326, ISLs, etc. In these types of static-only ASPM schemes, even when an NGSO smallsat 105 is "fully" shut down, certain systems must remain unmuted (turned on) and drawing some power, such as to continue monitoring a timer, or the like. Although such ASPM schemes are unable to react to any dynamic, semi-dynamic, or other conditions, such scheme can still save considerable power in comparison to fully powering all NGSO smallsats 105 of the constellation over the entire orbital cycles.

Other embodiments described herein are based both on static and dynamic power management (PM) parameters to provide dynamic ASPM. Static PM parameters are those features of the system that generally do not change over time and are predictable a priori. One example of a static PM parameter is geographic location-based service definitions. There can be some regions where service should not be provided, such as due to geo-political reasons or disputes. Similarly, service requirements can vary depending on whether the NGSO smallsats 105 are over land or over water. For example, an NGSO smallsat 105 typically serves more UTs 110 when over land than it does when over an ocean. Further, for NGSO smallsats 105 having orbits that pass over polar regions, those NGSO smallsats 105 likely serve very few UTs 110 while over those polar regions. Some ASPM schemes can consider that a smaller number of UTs 110 in a region can be served by a smaller number of NGSO smallsats 105, such that subsystems of some NGSO smallsats 105 may be able to be powered down when in those regions.

Another example of a static PM parameter is blockage-based service definition. Different topologies, such as oceans, mountain ranges, forests, dense urban centers, and the like, can tend to manifest a high probability of blockages than in other topologies (e.g., flat planes, rural areas, etc.). In higher blockage areas, providing reliable coverage can involve ensuring that more satellites are in view of ground terminals. Notably, some related data can account for semi-dynamic behavior. For example, areas of dense foliage may generate more blockages in the spring and summer than in the fall and winter, and building densities and heights can change in developing areas over time.

Another example of a static PM parameter is satellite motion, particularly a static determination of trajectory of the NGSO smallsats 105 and when those NGSO smallsats 105 will be in positions corresponding to different regions. In some implementations, an ephemeris file is used to obtain the trajectory and coverage areas of all NGSO smallsats 105 in the constellation. This data and data defining attributes (e.g., sizes, locations, MEAs, etc.) of GRs, spot beams, etc. can be used statically to estimate how much time a particular GR on the ground can be covered by a same spot beam (e.g., around 5-7 seconds) and from which locations on the ground a ground terminal has line-of-sight to a same NGSO smallsat 105 (e.g., 2-3 minutes). These quantities depend further on orbital parameters, such as orbital altitude, orbital plane, etc. Any of these quantities can be determined (or at least closely estimated) a priori and can be used to generate a time-based coverage map for the constellation, including which NGSO smallsats 105 are candidates at which times for providing coverage to which GRs.

Dynamic PM parameters are generally those which change over time in a manner that is partially or wholly unpredictable a priori (i.e., a change may be predictable some time before it occurs, but not prior to launch). In some cases, dynamic parameters can be obtained based on feedback, such as from present feedback about system status (e.g., link quality, traffic demand, etc.) and/or from monitoring and aggregating such feedback over time (e.g., based on statistics, trends, thresholds, etc.). In other cases, such feedback is provided to machine learning and/or artificial intelligence networks (e.g., artificial neural networks) to determine which feedback data is relevant, in which ways changes in the data are relevant and/or what are the most appropriate actions to take in response to the data.

Such machine learning can be implemented in any feasible manner. For example, traffic demand data from each GR is collected during each orbital cycle. The data might include parameters, such as the volume of data transmitted and received, the number of active terminals, service quality metrics, time of day, traffic priority, etc. External factors can also be integrated, such as weather conditions, special events, seasonal trends, service plans of customers in the GR, etc. The data can be cleaned, normalized, and possibly enriched with derived features to capture temporal patterns. Several types of machine learning networks can be used, such as deep learning models (e.g., convolutional neural networks (CNNs), transformer models, recurrent neural networks (RNNs), long short-term memory (LSTM) networks, gated recurrent units (GRUs), etc.), time series forecasting models (e.g., ARIMA (autoregressive integrated moving average), seasonal ARIMA, etc.), regression models (e.g., random forest regressors, gradient boosting machines, etc.), and others.

One example of a dynamic PM parameter is data relating to service plans and numbers of subscribers by region. Although some capacity and demand predictions are made a priori, actual present information on service plans and subscribers is only known when the constellation and network are in operation. Such information will tend to vary over time, for example, as new subscribers are added, service offerings change, etc. Such information also constantly varies due to changing locations of mobility terminals. Embodiments can receive updates over time and/or can dynamically learn over time about service plans and number of subscribers that need to be supported in each GR.

Another example of a dynamic PM parameter is data relating to state of charge of the power store 324. Such data can include present and/or aggregated measurements of voltage, current, temperature, state of charge (SOC), depth of discharge (DOD), charge/discharge cycles, internal resistance, efficiency, capacity, energy content, charge rate, discharge rate, and/or any other salient data. Another example of a dynamic PM parameter is data relating to link quality. Some such data can be measured and/or monitored at the NGSO smallsats 105, such as signal-to-noise ratio (SNR), frequency stability, phase noise, and polarization purity. Other such data can be measured and/or monitored by ground terminals (e.g., gateway terminals 120), such as bit error rate (BER), carrier-to-noise ratio (C/N), carrier-to-interference-plus-noise ratio (CINR), throughput, latency, packet loss, modulation error ratio (MER), link margin, fading characteristics. Another example of a dynamic PM parameter is data relating to an effective coverage area of each NGSO smallsat 105. For example, the traffic demand and traffic priority associated with each NGSO smallsat 105 can be highly dynamic in real time over time and space, such as in scenarios of dynamic spot beam management where coverage changes based on time of day, demand variations, and/or other factors.

In addition to static and dynamic PM parameters, embodiments can consider semi-dynamic PM parameters. One example of a semi-dynamic PM parameter is data relating to power profile. The power profile seeks to evaluate times when a NGSO smallsat 105 is in its sunlit and eclipse phases to determine, at each GR, whether the solar panel arrays 322 are receiving solar energy and/or how much (e.g., the angle of the sun's rays relative to a plane of the solar panel arrays 322, etc.). As described above, a static determination can be made to generally describe the timing and duration of sunlit and eclipse phases, such as resulting in a coarse (e.g., average) on/off duty cycle for using/charging the power store 324. However, determining the power profile at any particular time, or even for any particular orbital cycle, can be more dynamic due to a combination of dynamic factors and inherent complexities in celestial mechanics. For example, complex orbital dynamics arise from competing gravitational forces from at least the Earth, Moon, and Sun, which can cause subtle and complex perturbations in the NGSO smallsat's 105 orbit over time. Other such factors include atmospheric drag variation due to dynamic solar activity, atmospheric conditions, and satellite altitude; Earth shadow geometry, which can change in size and shape over time due to the elliptical nature of Earth's orbit around the Sun and the tilt of Earth's axis; measurement and modeling limitations as to celestial dynamics and/or other factors; transient events, such as solar and lunar eclipses; etc. Because of these and/or other factors, although the determination of power profile can be statically estimated at a coarse level, finer determination is a dynamic (e.g., learned) process; this PM parameter is thus considered to be semi-dynamic.

Another example of a semi-dynamic PM parameter is data relating to changes in satellite trajectory and orbital parameters over time. These changes can be due to some of the same factors described in relation to power profile, such as complex orbital dynamics, atmospheric drag, and transient events. Another factor is that the orbit of an NGSO smallsat 105 can gradually shift over time due to the oblateness of the Earth, among other factors. This orbital precession causes the plane of the satellite's orbit to rotate, which in turn affects the timing and duration of when the satellite enters and exits the Earth's shadow. Another factor is that the amount and angle of sunlight striking the Earth changes seasonally due to the tilt of the Earth's axis, which impacts the timing and duration of sunlit and eclipse phases. Similarly, because of the elliptical orbit of the Earth around the Sun, the distance between the Earth and the Sun changes throughout the year, which can slightly affect the Earth's shadow size and resulting eclipse phase duration. Another factor is changes in a NGSO smallsat's 105 orbit over time due to natural perturbations or intentional adjustments by operators, which can impact eclipse phase timing and duration. Although the determination of a satellite's trajectory and orbital parameters can be statically estimated at a coarse level, finer determination is a dynamic (e.g., learned) process; this PM parameter is thus considered to be semi-dynamic.

Static, dynamic, and semi-dynamic parameters are used by ASPM schemes to increase the efficiency of power delivery across the constellation, while also satisfying mission objectives (e.g., providing efficient data communication services at particular data rates, throughputs, quality of service, etc.). Increasing the efficiency of power delivery can provide various features such as reducing the cost of power components, reducing launch costs (e.g., by facilitating an overall reduction in size and mass), and increasing the lifetime of the NGSO smallsats 105.

As illustrated in FIG. 3, the NGSO smallsats 105 can include payloads 326 and a TT&C module 328. As described herein, the payloads 326 can include some or all of a feeder-link payload, a user link payload, and an ISL payload. The ASPM schemes are described herein as selectively muting or unmuting subsystems of the NGSO smallsats 105. Typically, the TT&C module 328 uses a relatively small amount of power. As such, some embodiments of the ASPM schemes do not turn on or off the TT&C module 328. In contrast, the payloads 326 include antennas and RF components (e.g., and other components, such as for signal processing) for transmitting and receiving signals and forming beams, such that the payloads 326 consume power to provide data communication services. ASPM schemes generally mute these payloads 326 at selective GRs (regions) and at times (two-dimensional aspects time and location) when not needed for transmitting or receiving data.

Some ASPM schemes can generally determine whether to mute or unmute all payloads 326. For example, ASPM schemes can determine for each GR at each time whether any payload 326 of a particular NGSO smallsat 105 is needed to satisfy mission objectives, and the NGSO smallsat's 105 payloads 326 can all be muted, if not. Other ASPM schemes can determine whether to mute or unmute selected payloads 326. For example, ASPM schemes can determine for each GR at each time whether each payload 326 (e.g., user-link, feeder-link, ISL, etc.) of a particular NGSO smallsat 105 is needed to satisfy mission objectives, and the NGSO smallsat's 105 payloads 326 can selectively mute only those unneeded payloads 326, if any. In some cases, the ASPM scheme can have control at the spot beam level. For example, rather than muting or unmuting entire payloads 326 and/or communication links, the ASPM scheme can direct an NGSO smallsat 105 only to illuminate certain spot beams, if doing so can reduce transmission power.

Constellation dynamics (i.e., orbital paths, planes, inclinations, altitudes, trajectories, etc.) for the NGSO smallsats 105 can be segmented by position (GR) and time, such that a location of each NGSO smallsat 105 of the constellation (e.g., relative to the Earth, relative to the sun, relative to other NGSO smallsats 105 of the constellation, etc.) can be defined in terms of its coverage of a particular GR at any particular time. For each GR at each time, embodiments determine, for each NGSO smallsat 105 of the constellation, a satellite resource availability (SRA) map of SRA estimates computed over orbital time and orbital location dimensions based on static, dynamic, and/or semi-dynamic PM parameters. The SRA map can effectively represent power supply and demand for each location and time. Embodiments generate an ASPM scheme based on the SRA map and predefined mission objectives that defines (e.g., statically or adaptively) whether to mute or unmute some or all subsystems (e.g., payloads 326) of one or more NGSO smallsats 105 at any particular time. In embodiments that use dynamic and/or semi-dynamic PM parameters, the SRA map is also dynamic and is continuously updated as relevant PM parameters change, and the ASPM scheme similarly updates along with any dynamic updates to the SRA map.

ASPM schemes can be impacted by static PM parameters in several ways. In low- or medium-Earth orbits (e.g., LEO, MEO, etc.), satellites spend considerable time over oceans and/or other large bodies of water. Although there may be few or no ground-based terminals in these regions, there may still be UTs 110, such as aero or maritime mobility UTs 110, which can rely on maintaining connectivity with the NGSO smallsats 105. When there is no blockage from the view of these mobility UTs 110 for aero or maritime applications, it is possible that multiple NGSO smallsats 105 will be in view simultaneously from any particular UT 110 or group of UTs 110. Because of the small number of UTs 110, it is likely that sufficient data communication capacity can be provided to these UTs 110 by only a subset (e.g., one) of the multiple NGSO smallsats 105 that are in view. Similar conditions can arise in polar regions, desert regions, mountainous regions, large dense forest regions, etc. In all these cases, static PM parameters can cause the SRA map to reflect that a smaller amount of payload capacity is needed to service the number of UTs 110 and/or their service plan rates in these GRs, and the ASPM scheme can define which payloads 326 of which NGSO smallsats 105 can be muted during which times, accordingly.

According to another set of scenarios, geo-political reasons, contractual reasons, and/or other reasons can define certain regions and/or times when data communication services should not be provided. This is defined in the static PM parameters and reflected in the SRA map, accordingly. The ASPM scheme will thereby indicate to mute subsystems (e.g., payloads 326) as NGSO smallsats 105 pass through those regions and/or times. According to another set of scenarios, static PM parameters can define where blockages are prevalent (e.g., more over dense urban areas, and fewer over the ocean). In some cases, prevalence of blockages results in particular NGSO smallsats 105 effectively not being visible from certain Earth locations (i.e., they are blocked by the blockages, even though they would be visible if not for the blockages). In such cases, the ASPM scheme can indicate to mute subsystems (e.g., payloads 326) as NGSO smallsats 105 pass through those blockage regions. In other cases, prevalence of blockages can result in a scenario where it is desirable to have more NGSO smallsats 105 available to reduce the chance of any particular UT 110 being out of view of all NGSO smallsats 105 at the same time. In such cases, the ASPM scheme can unmute payloads 326 of multiple NGSO smallsats 105 in these blockage regions.

Notably, the resulting ASPM scheme is time varying, even when only static PM parameters are considered. Because of the orbital motion of the NGSO smallsats 105, different NGSO smallsats 105 of the constellation will enter and leave the field of view of any particular UT 110 or gateway terminal 120. Further, although multiple NGSO smallsats 105 may be in view of a particular UT 110 or gateway terminal 120, the UT 110 or gateway terminal 120 may only be able to connect to a single NGSO smallsat 105 at a time. Accordingly, providing continuous service to any particular UT 110 or gateway terminal 120 involves handing off communications from one NGSO smallsat 105 to the next as NGSO smallsats 105 enter and leave the fields of view of those terminals.

For example, a particular NGSO smallsat 105 may be one of multiple NGSO smallsats 105 presently over the ocean and in view of a relatively small number of aero and maritime terminals, and the ASPM scheme indicates to mute the payloads 326 of that NGSO smallsat 105. However, shortly thereafter, that same NGSO smallsat 105 will be over land and will be needed to provide data communication capacity to a relatively large number of coastal ground terminals. Thus, the ASPM scheme will indicate to unmute those payloads 326 at an appropriate time/location. Conversely, payloads 326 that were unmuted by the ASPM scheme for certain times/locations may be muted at other times/locations. As such, particular NGSO smallsats 105 and/or particular payloads 326 of NGSO smallsats 105 will experience cycles of turned-on (unmuted) or turned-off (muted) payload events throughout its orbital journeys.

ASPM schemes can also be impacted by dynamic (and semi-dynamic) PM parameters in several ways. For example, a finer granularity of power control can be realized by accounting for parameters that vary over time from a same geographical region. For example, dynamic changes in bandwidth demand from users, priority of traffic, service plans of users in a particular GR, etc. can all have a dynamic impact on SRA and can thereby impact the ASPM scheme. Such dynamic changes can occur somewhat periodically (e.g., somewhat consistent trends at different times of day, at different times of the year, etc.), from day to day, from orbital cycle to orbital cycle, over longer time frames, etc. Such patterns can be learned using trend analysis, by machine learning, and/or in other ways. Based on these dynamic changes, the ASPM scheme can determine when to mute and unmute subsystems (e.g., payloads 326) to reduce power consumption.

As described above, other dynamic PM parameters can drive changes to the SRA map, and thereby to the ASPM scheme. For example, over time, the rates of charging and discharging the power store 324 may change (e.g., the batteries lose charge more rapidly over time). Thus, even if durations of sunlit and eclipse phases are considered as substantially static, the power store 324 may obtain less charge during sunlit phases over time and/or may lose more charge during eclipse phases over time. Accounting for this information (e.g., monitoring state of charge and/or other similar data for the power store 324) allows the SRA map to increase the accuracy of its SRA determination over time, and the ASPM scheme can be more finely tuned to real-world dynamics, accordingly. Similarly, the ASPM scheme can be reactive to these types of data. For example, it can be undesirable for certain power store 324 components to become fully discharged (e.g., it can shorten the life of those components). If dynamic updates to the SRA map indicate that, for an NGSO smallsat 105 that is presently in an eclipse phase, the power store 324 of has fallen below a predetermined SOC threshold (e.g., 20 percent), the ASPM scheme can responsively shut down the payloads 326.

Failure to meet mission objectives without causing power stores 324 of NGSO smallsats 105 to fall below predetermined SOC thresholds can indicate a failure in the design of the constellation and/or can be a sign that one or more NGSO smallsats 105 is nearing its end of life. In some such cases, detecting such conditions (e.g., or detecting such conditions some threshold number of times) can trigger sending a notification to the CME 130, or to any other suitable centralized entity (e.g., the constellation planning system 340, a network operations center (NOC), etc.). The notification can be used by operators to take remedial action where possible (e.g., by remotely adjusting constellation dynamics, by launching additional satellites, etc.) ad/or to plan for end-of-life scenarios.

Figure 5:
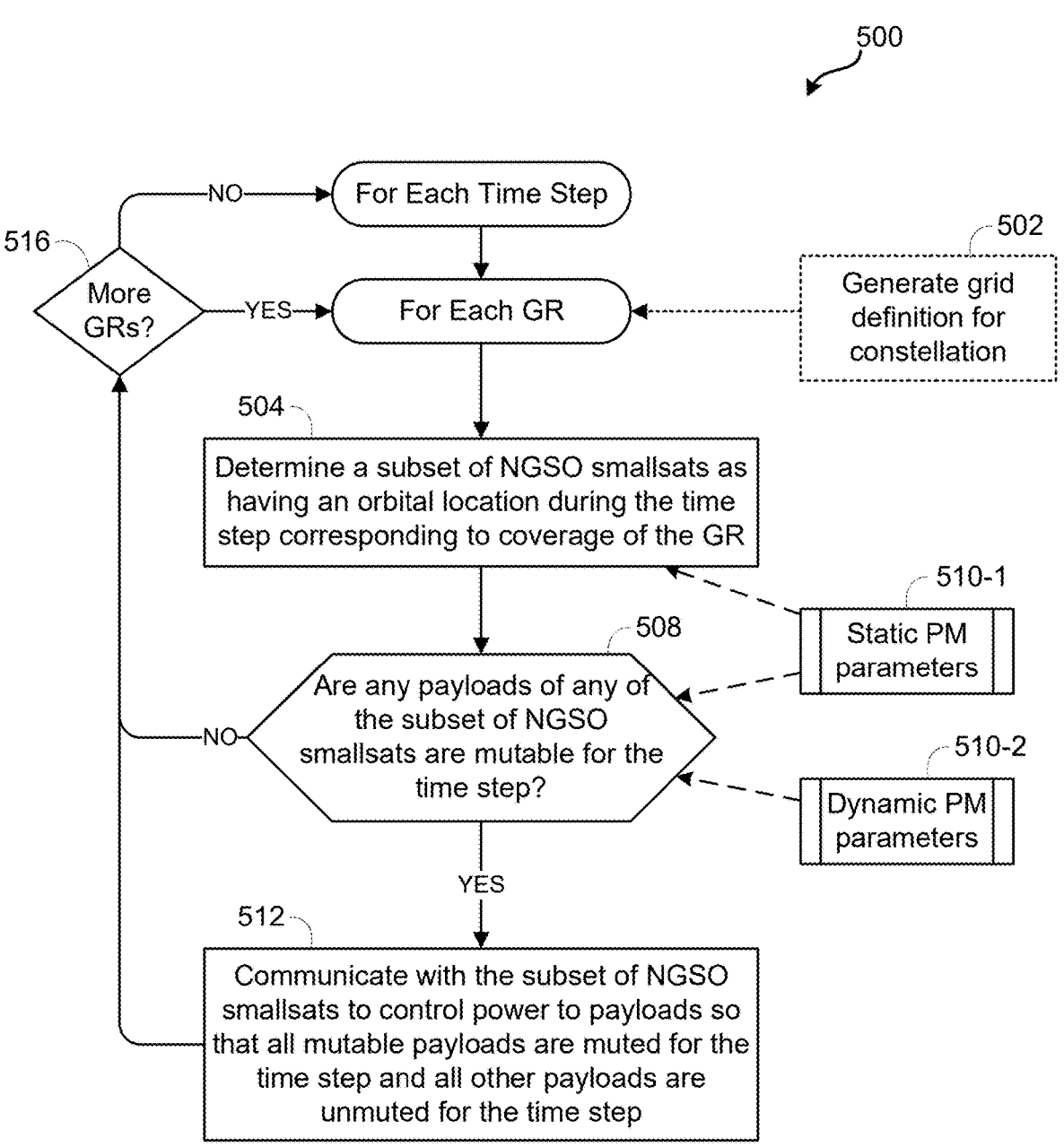
FIG. 5 shows a flow diagram of an illustrative method for adaptive satellite power management for a satellite communication system having a constellation of NGSO smallsats, according to some embodiments described herein.

FIG. 5 shows a flow diagram of an illustrative method 500 for adaptive satellite power management for a satellite communication system having a constellation of non-geosynchronous orbit (NGSO) smallsats, according to some embodiments described herein. Some embodiments begin at stage 502 by generating a grid definition for the constellation. The grid definition represents grid regions (GRs), each corresponding to a segment of a geographic coverage area of the satellite communication system. As described herein, the constellation can include M orbits (M is a positive integer) of N NGSO smallsats per orbit (N is an integer greater than 1). As the NGSO smallsats traverse their orbital paths, their respective coverage areas will coincide successively with different GRs. As such, at different times, terminals in each GR will potentially be in view of and/or serviced by different ones of the NGSO smallsats.

Embodiments of the method 500 can continuously iterate according to timesteps. In one implementation, such as where only static PM parameters are considered, the timestep is based on an orbital period (e.g., an average or nominal orbital period) of the NGSO smallsats. In other implementations, each timestep can be defined as any feasible duration of time, such as some number of minutes or seconds. For each timestep, embodiments of the method 500 can further iterate for each of the GRs defined by the grid definition. The number of GRs can depend on the total coverage area of the constellation, the resolution of the grid definition, and/or other factors. For example, there may be several hundred GRs or more in a global coverage area.

For each GR, embodiments can perform some or all of stages 504-516. In general, each iteration seeks to determine which, if any of the NGSO smallsats have payloads that can be muted for the timestep based on their respective GR (or sub-GR) locations and static and/or dynamic PM parameters. At stage 504, embodiments can determine, based on static PM parameters 510-1 (e.g., predefined orbital dynamics of the constellation of NGSO smallsats), a subset of the NGSO smallsats as those having an orbital location during the timestep corresponding to coverage of the GR. For example, each of the NGSO smallsats produces one or more spot beams that is directed (e.g., formed, shaped, pointed, steered, etc.) to cover a spot beam coverage area. Each subset is those of the constellation of NGSO smallsats that have spot beams covering areas overlapping with the GR.

At stage 508, embodiments determine whether there are any payloads of any of the subset of NGSO smallsats determined in stage 504 that are "mutable" for the timestep. As used herein, a mutable payload is one with that is restricted from use in its present GR (e.g., due to a grid-level access restriction), one that that it is not usable in its present location (e.g., due to blockage, sun outage, etc.), or one for which it is determined that constellation mission objectives (e.g., contractually obligated levels of communication services) can be maintained without using that payload. As described herein, this determination can be made based on static PM parameters 510-1 (e.g., whether there is a grid-level access restriction, blockage, sun outage, etc.) and/or dynamic PM parameters 510-2 (e.g., present capacity supply and demand considerations). In some embodiments, only user-link payloads are considered. In some embodiments, feeder-link payloads are also considered. In some embodiments, ISL payloads are also considered.

If it is determined at stage 508 that no payloads are mutable for the iteration timestep in the iteration GR, the method 500 can proceed to stage 516 to determine whether there are more GRs to evaluate. If it is determined at stage 508 that there are mutable payloads for the iteration timestep in the iteration GR, embodiments can mute all those mutable payloads at stage 512. For example, at stage 512, embodiments can communicate with the subset of NGSO smallsats to control power to the payloads (e.g., user-link payloads and/or other payloads) so that all mutable payloads of the payloads are muted for the timestep and all others of the payloads are unmuted for the timestep. As described herein, muting a payload can include shutting down power to the payload (e.g., to any active RF components and other supporting components), or switching the payload to a low-power mode (e.g., idle, sleep, standby, etc.). Conversely, unmuting a payload can include fully powering the payload (e.g., activating all RF components and other supporting components). It is expected that any payload that can be muted is either in a muted or an unmuted state prior to stage 512. As such, muting an already muted payload can involve simply leaving the payload in the muted state, and unmuting an already unmuted payload can involve simply leaving the payload in the unmuted state.

Subsequent to stage 512, embodiments can proceed to stage 516 to determine whether there are more GRs to evaluate. From stage 516, if there are more GRs to evaluate, embodiments can proceed with a next iteration for a next one of the GRs; if not, embodiments can proceed with a next iteration for a next one of the timesteps. The method 500 shows stage 512 occurring in each iteration for each GR. Some embodiments determine which payloads across the entire constellation (e.g., or over logical portions of the constellation, such as over the NGSO smallsats of a particular orbital plane, etc.) are mutable prior to communicating power management controls in stage 512. For example, in each timestep, the method 500 can iterate through stages 504 and 508 to identify mutable payloads for each GR, and then can perform stage 512 one time for all mutable payloads for all GRs.

In some embodiments, the determination at stage 508 as to whether any of the payloads of the subset of the NGSO smallsats are mutable payloads for the timestep includes determining whether there is a grid-level access restriction for the GR. As described herein, the grid-level access restriction can be based on geopolitical considerations, contractual considerations, or the like, which define regions in which the satellite operation is restricted from providing communication services (at least user-link services). If a grid-level access restriction for the GR is determined at stage 508, embodiments can identify all payloads (e.g., all user-link payloads) of the subset of NGSO smallsats as mutable payloads for the timestep. In some such embodiments, one a grid-level access restriction is determined for the GR and all the relevant payloads are toggled to the appropriate muted/unmuted state, the method 500 can proceed to the next GR without further evaluation of conditions for stage 508.

In some embodiments, the determination at stage 508 as to whether any of the payloads of the subset of the NGSO smallsats are mutable payloads for the timestep includes obtaining position information for each of the subset of NGSO smallsats in the GR in the timestep, and obtaining topological blockage information for the GR, and determining a subset of the payloads of the subset of NGSO smallsats as having visibility that is topologically blocked based on corresponding portions of obtained information. In such embodiments, the mutable payloads for the timestep can determined to include the subset of the payloads.

In some embodiments, the determination at stage 508 as to whether any of the payloads of the subset of the NGSO smallsats are mutable payloads for the timestep includes obtaining position information in the timestep for the sun, for each of the subset of NGSO smallsats, and for coverage areas of the user-link payloads of the subset of NGSO smallsats. In such embodiments, the mutable payloads for the timestep can be determined to include one of the user-link payloads of one of the subset of NGSO smallsats responsive to determine that the one of the user-link payloads has a sun outage condition due to an alignment in the timestep between positions of the sun, the one of the subset of NGSO smallsats, and a corresponding one of the coverage areas of the one of the user-link payloads.

In some embodiments, the determination at stage 508 as to whether any of the payloads of the subset of the NGSO smallsats are mutable payloads for the timestep includes identifying X (a positive integer) of the payloads of the subset of NGSO smallsats as candidate mutable payloads, and ranking each of the X candidate mutable payloads based on a respective magnitude of impact to providing communication services in the GR in the timestep that is estimated to result from muting the candidate mutable payload. Y mutable payloads can then be selected as a subset of the X candidate mutable payloads (i.e., Y is a positive integer less than X) ranked as having the lowest ones of the respective magnitudes of impact. For example, when there are multiple options for payloads that can be muted in the GR for the timestep, embodiments can use one or more ranking factors (e.g., present link conditions for each payload, traffic priority of each payload, etc.) to preferentially mute those of the payloads that will have the least impact to satisfying constellation mission objectives in the timestep.

For example, embodiments calculate a total capacity needed to serve all terminals in the GR in the timestep (e.g., over the next half-minute to one minute). This can be used to calculate the number of satellite payloads that can be muted over the timestep while still providing the total capacity, which can be Y. Thus, X candidate mutable payloads are ranked to find the Y best candidates for muting. For example, the ranking can be based on the following parameters: state of charge of power stores, whether there is presently an eclipse phase or a sunlit phase, and link qualities with respect to terminals to be served in the GR. Different weights can be assigned to the parameters (e.g., highest weight to the state of charge of batteries, and lowest weight to the link quality), and the weighted values can then be used for ranking. Rankings can account for particular (e.g., even if unlikely) circumstances. For example, it is possible that the power store is fully charged during a sunlit phase, such that energy generated by the solar panel arrays is in excess of the power required by the satellite at that point. In such a case, a flag may be communicated (e.g., to the smart scheduler) indicating this condition, and payloads in these conditions can be ranked as least preferable to be muted.

In some embodiments, the determination at stage 508 as to whether any of the payloads of the subset of the NGSO smallsats are mutable payloads for the timestep includes computing a payload resource demand estimate for the GR for the timestep, and identifying user-link payloads of the subset of NGSO smallsats as mutable payloads for the timestep by determining at least that the payload resource demand estimate is satisfiable by the subset of NGSO smallsats without using the mutable payloads. In some such embodiments, the payload resource demand estimate is computed for the GR for the timestep based on static PM parameter data, such as by obtaining subscription information indicating a quantity of subscribers to communication services of the satellite communication system in the GR and/or service plans associated with the subscribers in the GR. In some such embodiments, the payload resource demand estimate for the GR for the timestep is computed based on dynamic PM parameter data, such as by obtaining, from one or more of the constellation of NGSO smallsats, data indicating present usage of payload resources by subscribers to communication services of the satellite communication system in the GR.

In some embodiments, the determination at stage 508 as to whether any of the payloads of the subset of the NGSO smallsats are mutable payloads for the timestep includes determining, based on static power management parameter data, whether any operational gateway terminals are located in the GR. If there are no operational gateway terminals are located in the GR (e.g., no gateway terminals, or no gateway terminals that are functioning properly), the feeder-link payloads of the subset of NGSO smallsats can be identified as mutable payloads for the timestep.

In some embodiments, the determination at stage 508 as to whether any of the payloads of the subset of the NGSO smallsats are mutable payloads for the timestep includes determining whether constellation mission objectives can be satisfied in the timestep without one or more ISL payloads of the subset of NGSO smallsats. If so, any ISL payloads that are not needed to satisfy constellation mission objectives in the timestep can be identified as mutable payloads for the timestep.

Notably, integration of ISL capabilities into the NGSO smallsats can appreciably increase the power demands of the NGSO smallsats, increasing the value of power management approaches described herein. An NGSO smallsat, even though not directly serving any GR at a particular timestep, may still be supporting ISL in that timestep. A topology of ISL between NGSO smallsats can be first determined during the planning process and may be changed, if dynamic routing is employed in ISL links. Thus, cases can arise in which user-link payloads are muted on an NGSO smallsat, but the ISL payload is left unmuted. Conversely, there may be cases where an NGSO smallsat is directly serving terminals in the GR, but is not engaged in ISL communications for the timestep; so that the ISL payload can be muted even when other payloads cannot. This suggests that it is desirable in some embodiments to design the NGSO smallsats to have ISL payloads that are separate from those providing communications with ground terminals. Additionally, it is typical that the ISL payloads are based on optical communication links, while the other payloads are based on RF links.

In cases where dynamic ISL routing is supported, some embodiments can propagate the routing topology (e.g., to the smart scheduler located in the central management center) via a control plane protocol, assuming that an SDN-based routing mechanism is used in the system. The smart scheduler can use this information to make decisions about muting or unmuting the ISL payloads at different timesteps. In other embodiments that support dynamic ISL routing, the ASPM scheme can be generated in a manner that drives ISL routing decisions by selecting a path based on increasing power savings.

Figure 6:
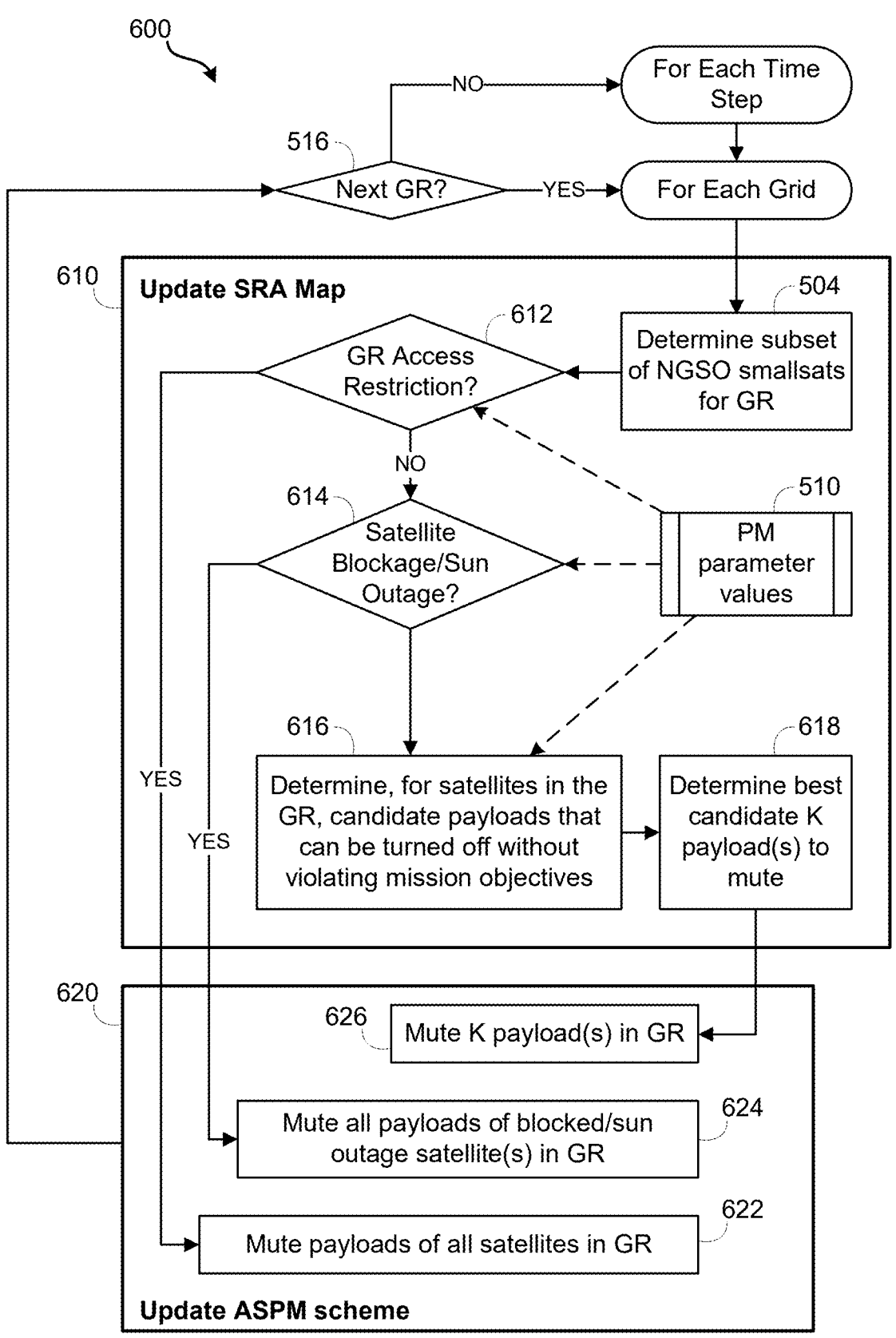
FIG. 6 shows a flow diagram of another illustrative method for adaptive satellite power management for a satellite communication system having a constellation of NGSO smallsats, according to some embodiments described herein.

FIG. 6 shows a flow diagram of another illustrative method 600 for adaptive satellite power management for a satellite communication system having a constellation of non-geosynchronous orbit (NGSO) smallsats, according to some embodiments described herein. Embodiments of the method 600 can be an implementation of the method 500 of FIG. 5. As in FIG. 5, embodiments can begin by generating a grid definition for the constellation (not explicitly shown, and embodiments can iterate continuously according to timesteps and can iterate within each timestep for each GR.

As illustrated, the method 600 follows two super-stages: updating a satellite resource availability (SRA) map in super-stage 610; and updating (and executing) an automated satellite power management (ASPM) scheme in super-stage 620. Updating the SRA map in super-stage 610 generally involves determining, based on static and/or dynamic PM parameters, which (if any) payloads in each GR can be muted for each timestep. Updating and executing the ASPM scheme in super-stage 620 generally involves remotely directing management of the power systems of the NGSO smallsats to mute and/or unmute payloads based on the determinations in stage 620. As such, super-stage 610 can represent an implementation of stages 504 and 508, and super-stage 620 can represent an implementation of stage 512.

As illustrated, super-stage 610 can include stages 504 and 612-618, and super-stage 620 can include stages 622-626. As described with reference to FIG. 5, embodiments can determine, at stage 504, a subset of the NGSO smallsats located during the timestep in orbital positions corresponding to servicing the GR. At stage 612, embodiments can determine whether there is a grid-level access restriction for the GR. If so, at stage 622, embodiments can mute all the payloads (e.g., or all user-link payloads) of all the subset of NGSO smallsats. If there is no grid-level restriction, at stage 614, embodiments can determine whether there are any topological blockage or sun outage conditions. If so, at stage 624, embodiments can mute any payloads (e.g., or any user-link payloads) of the subset of NGSO smallsats impacted by a topological blockage or sun outage condition.

For any remaining payloads of the subset of NGSO smallsats for the GR not identified in stage 614, the method 600 can proceed at stage 616 by determining whether there are any payloads of NGSO smallsats in the GR that can be muted without violating constellation mission objectives. For example, can any payloads be muted while still being able to serve all capacity demands in the GR. At stage 618, those identified payloads can be ranked to determine the best payloads to mute (e.g., those that will have the least impact if muted). At stage 626, embodiments can mute any payloads (e.g., or any user-link payloads) determined as the best ones to mute in stage 618.

Subsequent to completing super-stages 610 and 620 for the GR, embodiments can proceed to stage 516 to determine whether there are more GRs to evaluate. From stage 516, if there are more GRs to evaluate, embodiments can proceed with a next iteration for a next one of the GRs. If there are no more GRs to evaluate for the timestep, embodiments can proceed with a next iteration for a next one of the timesteps.

Referring back to FIG. 3, embodiments of automated power management, such as those illustrated by methods 500 and 600, can be implemented by smart scheduler 345 having some or all of its features centralized in a CME 130. The smart scheduler 345 can have some features distributed to one or more gateway terminals 120. The smart scheduler 345 can direct the power management scheduler 330 of the NGSO smallsats 105 to mute or unmute selected payloads 326 (e.g., according to the ASPM scheme). The directing can occur in any suitable manner and with any suitable timing. In some embodiments, only static PM parameters are used by the smart scheduler 345 to develop the ASPM scheme. As such, all the information can be known a priori and can be loaded to the power management schedulers 330 of the NGSO smallsats 105 either prior to launch or on-orbit.

In other embodiments, static and dynamic PM parameters are used by the smart scheduler 345 to develop and dynamically update the ASPM scheme. In some such embodiments, a baseline ASPM scheme is loaded to the power management schedulers 330 of the NGSO smallsats 105 based on static PM parameters (e.g., prior to launch or initially on-orbit), and dynamic PM parameters (e.g., and static PM parameters) are used to dynamically update the ASPM scheme and to send relevant updates to the power management schedulers 330. In other such embodiments, there is no baseline ASPM scheme. Rather, static and dynamic PM parameters are used to dynamically generate the ASPM scheme and to send relevant updates to the power management schedulers 330.

The ASPM scheme can be communicated to the power management schedulers 330 in any suitable manner. In some embodiments, the smart scheduler 345 periodically communicates the ASPM scheme as a file (e.g., a configuration file, script, etc.) to all NGSO smallsats, and the power management schedulers 330 execute (e.g., compile, run, etc.) the file, thereby muting and/or unmuting their payloads, accordingly. In other embodiments, the smart scheduler 345 periodically communicates the ASPM scheme as one or more commands to toggle the state of indicated payloads 326 between muted and unmuted states.

For example, because of the predictable nature of orbital motion of satellites and their precise positions in orbits at any given time, such information can be predetermined or known a priori at the start of a mission and can be loaded in the system. The information can also be loaded into the smart scheduler 345. This information is known before the start of a mission because the planning process determines orbital parameters and other parameters of low earth orbit satellite constellations including altitude, plane, and inclination of an orbit. The trajectory of a satellite is generated as a set of ephemeris files by the system, and these files are loaded in various components.

Embodiments of the smart scheduler 345 can communicate with the NGSO smallsats 105 in any suitable manner. For example, features in the CME 130 can be communicatively coupled with gateway terminals 120. When communicating with an NGSO smallsat 105 to send any command (e.g., in execution of the ASPM scheme) embodiments can communicate messages via whichever gateway terminal 120 is presently in view of the target NGSO smallsat 105. In some embodiments, the CME 130 also acts as the ground-based TT&C for the NGSO smallsats 105. In such embodiments, the smart scheduler 345 can communicate with any particular satellite via the appropriate gateway terminal's 120 TT&C feeder-link. At the NGSO smallsat 105, the TT&C MODULE 328 can be coupled with the power management scheduler 330 to direct power management control based on the received signals from the smart scheduler 345.

Embodiments of the smart scheduler 345 provide several features. Embodiments of the smart scheduler 345 dynamically keep track of terminals that are installed and configured for service along with their service plans for both fixed and mobile terminals across the land and ocean coverage. Embodiments of the smart scheduler 345 can also keep track of which terminals are fixed and which are mobile, and if a terminal is mobile, whether the mobility type is land mobile, aero, or maritime. For a fixed terminal, the position of the terminal is stored. For mobility terminals, in some cases, it can be known a priori the movement of a terminal or user. Embodiments of the smart scheduler 345 know the trajectory and earth coverage of all NGSO smallsats 105 in the constellation.

Embodiments of the smart scheduler 345 can receive statis information from the NGSO smallsats 105, such as information indicating present link conditions, present traffic, present state of charge of the power store 324, etc. For example, such information is downlinked from the TT&C MODULE 328 on the NGSO smallsat 105 to the smart agent gateway 315 at a gateway terminal 120 and relayed from the smart agent gateway 315 to the smart scheduler 345. Embodiments of the smart scheduler 345 are provided with satellite ephemeris, and eclipse periods. Embodiments of the smart scheduler 345 are provided with geographical based grid regions (GRs), along with the information on some or all of geo-political access restrictions, demand, and priority of traffic on a per-GR basis. Embodiments of the smart scheduler 345 are provided with terminal blockage data and/or topological blockage data. Embodiments of the smart scheduler 345 are provided with information and functions for computing sun outage events.

As described herein, this and/or other data is used by the smart scheduler 345 to generate and/or update the ASPM scheme and thereby to control the muted/unmuted stated of payloads 326 of the NGSO smallsats 105. In cases where the NGSO smallsats 105 are LEO satellites (or in other relatively low Earth orbits), the latency experienced by commands from the smart scheduler 345 can be very low, such as less than ten milliseconds.

Various frequency bands are used in a satellite communication, such as L-band, S-band, and higher frequency Ku, Ka, Q, V, and E-bands. For example, millimeter-wave communications can be used to provide high data rate services to users, while lower bands (L- and S-bands) can be well suited to serve Internet of things (IoT) devices, which can be heavily power constrained. Generally, with regard to energy consumption, power requirements increase as the frequency band becomes higher. Two scenarios can be considered: each NGSO smallsat 105 supports a single band by hosting either a lower band payload 326 or higher band payload 326; or each NGSO smallsats 105 can host a hybrid of low- and high-band payloads.

In both scenarios, ASPM techniques described herein can be used to selectively mute or unmute payloads 326 of certain bands. For example, when multiple NGSO smallsats 105 are in view of a group of small, power constrained IoT devices, embodiments of the smart scheduler 345 can mute communication of payloads 326 for higher bands with a philosophy of servicing IoT devices by lower band payloads 326 (e.g., which presumably consume less power). In the first scenario, embodiments can prefer to mute NGSO smallsats 105 hosting a higher band payload. In the second scenario (in which a single NGSO smallsat 105 can support multiple bands), embodiments can prefer to mute the higher band payload(s) of the NGSO smallsats 105. For example, embodiments of the smart scheduler 345 keep track of types of terminals (e.g., UTs 110) in each GR (e.g., as a static or semi-dynamic PM parameter). The smart scheduler 345 can predict which terminals (e.g., UTs 110) an NGSO smallsat 105 is going to serve in a GR and can mute selective payloads 326 of the NGSO smallsat 105, accordingly (e.g., by sending appropriate commands to the TT&C module 328 through the feeder link 310 of an appropriate gateway terminal 120). For example, if an NGSO smallsat 105 is serving only IoT devices, the higher band data communication payloads 326 are muted; if the NGSO smallsat 105 is not serving any IoT devices, the lower band payload 326 may or may not be muted. If it is deemed that the higher band payload 326 has enough capacity to meet service requirements, then the lower band payload 326 may be muted; otherwise, both types of payloads 326 can provide services to non-IOT terminals. For example, there may be terminals which carry small amounts of text messaging data.

In some embodiments, the smart scheduler 345 is configured to prefer to mute all payloads 326 of each of fewer NGSO smallsats 105, rather than a portion of the payloads 326 of larger numbers of NGSO smallsats 105. For example, consider two NGSO smallsats 105, each having two payloads 326: one S-band and the other Ka-band. At a given time, based on the mission, it is determined that one S-band payload 326 and one Ka-band payload 326 can be muted. Instead of muting the S-band payload 326 in one NGSO smallsat 105 and the Ka-band payload 326 in the other NGSO smallsat 105, embodiments can prefer to select one of the NGSO smallsats 105 and mute both its payloads 326. This can yield higher power conservation when possible.

Typically, each NGSO smallsat 105 supports bidirectional communication with ground stations (i.e., uplink and downlink). Uplink and downlink can be implemented in different subsystems within a payload 326. In such cases, embodiments can treat each different subsystem as a different effective payload 326 and can selectively mute or unmute either the uplink or downlink "payload" (i.e., subsystem of the payload 326) when not needed to satisfy uplink or downlink demand. For example, an NGSO smallsat 105 is receiving signals from ground stations but is not presently communicating any downlink signals (e.g., this is a signal that will be relayed to an adjacent satellite via ISL) the received signal; the smart scheduler 345 can direct the NGSO smallsat 105 to mute the downlink "payload." Conversely, an NGSO smallsat 105 is presently tasked to downlink signals received via ISL, but is not receiving uplink signals; and the smart scheduler 345 can direct the NGSO smallsat 105 to mute the uplink "payload."

In some embodiments, a state of charge (SoC) threshold is defined for the power stores 324. As described herein, SoC data can periodically (or as needed) be sent to the smart scheduler 345 from the TT&C modules 328 of the NGSO smallsats 105. Embodiments can detect a condition in which an NGSO smallsat 105 is in an eclipse phase and has a SoC below the defined SoC threshold. In response to detecting such a case, embodiments of the smart scheduler 345 can mute payloads 326 of that NGSO smallsat 105 (to protect the power store 324) even if doing so will cause present demand in the GR not to be fully satisfied.

In some embodiments, the power management schedulers 330 onboard the NGSO smallsats 105 can provide an additional level of ASPM. Such onboard ASPM can provide further power conservation in cases when the NGSO smallsat 105 is in a GR, is known to be serving terminals in the GR, and is not being muted by the smart scheduler 345. Such embodiments can operate based on monitoring SoC. Onboard task scheduling is subjected to many constraints, including the amount of power available at a given time from a combination of the solar arrays 322 and the power store 324 (during sunlit phases), or from the power store 324 alone (during eclipse phases). Such embodiments seek to maximize the number of tasks to be executed by the NGSO smallsat 105 within the constraint of the amount of power available at any moment along the course of an orbit journey. An optimization model is formulated to contemplate task priority, minimum and maximum numbers of task activations, minimum and maximum execution times, minimum and maximum periods of a given task, and execution windows. The smart scheduler 345 can decide which tasks can be executed at any given moment considering service requirements and available resources with a goal of matching energy consumption to energy input. In some implementations, the smart scheduler 345 makes its task decisions in a manner that seeks energy-neutrality, while ensuring that any required tasks are executed and that quality of service and/or related mission objective metrics are maintained. Energy neutrality is met so long as energy consumption is less than or equal to energy input at all times.

Some embodiments described herein exploit communications over the TT&C link to implement ASPM features. Thus, such embodiments cannot mute the TT&C links (e.g., turn off the TT&C modules 328) using the same power management control mechanisms. In some embodiments, the power management scheduler 330 onboard the NGSO smallsat 105 can determine when the downlink of TT&C can be turned off. For example, the onboard power management scheduler 330 can know when to communicate SoC, command acknowledgements, and/or other information to the smart scheduler 345. Embodiments of the power management scheduler 330 can be configured to keep the TT&C downlink muted at all times, except when needed. Some embodiments can also keep the TT&C uplink muted and can periodically wake up the uplink to check if there is any command from the ground station. For example, the power management scheduler 330 can wake up its TT&C uplink according to downlink receiver (DRX) cycles, which are typically in very small intervals (e.g., every one or two minutes).

Figure 7:
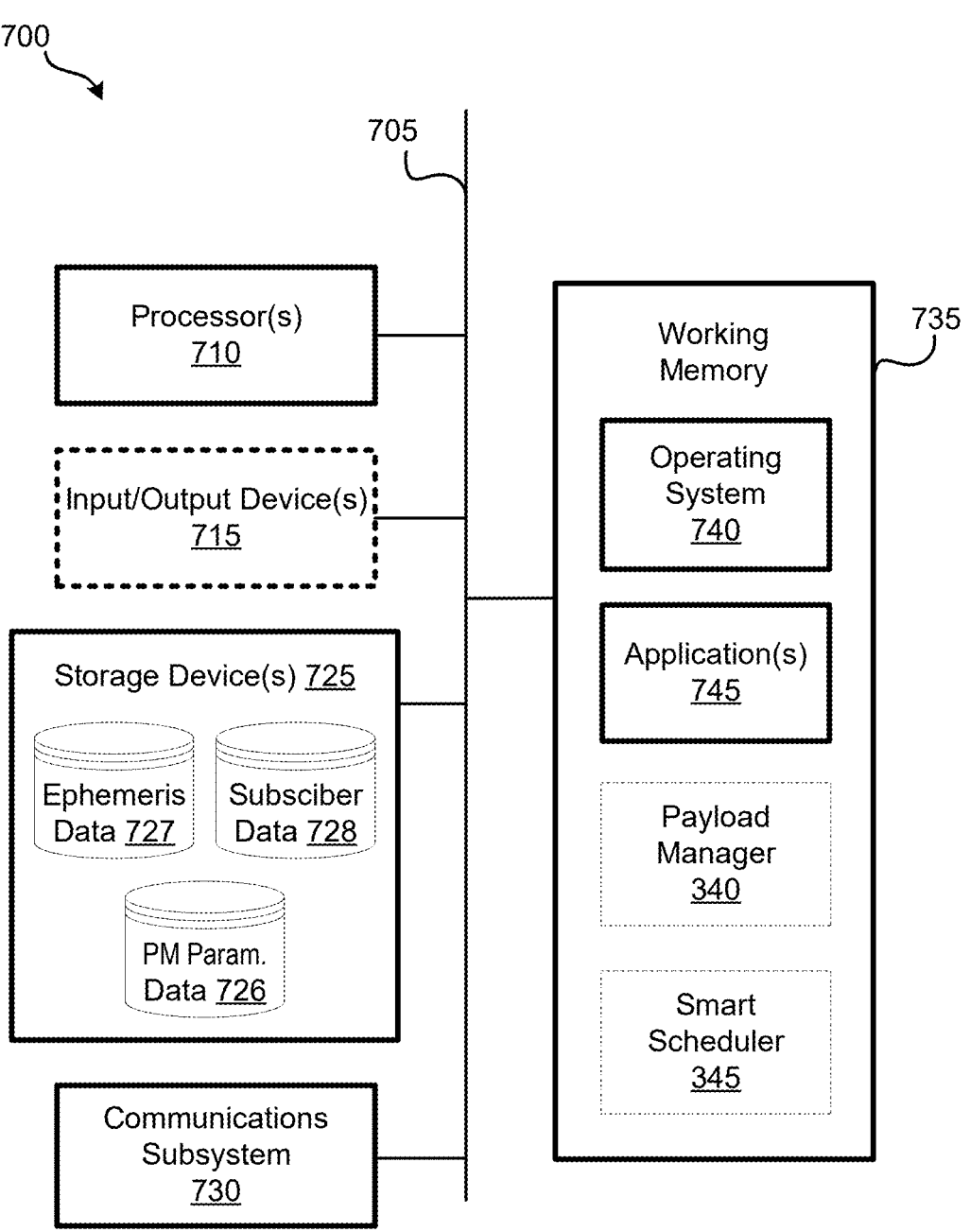
FIG. 7 provides a schematic illustration of an embodiment of a computational system that can implement various system components and/or perform various steps of methods provided by various embodiments.

In some embodiments, ASPM-related features described herein are implemented by a computational environment. The computational environment can be fully disposed in a central management entity, such as the CME 130 of FIG. 1 or 3. Alternatively, some aspects of the computational environment are disposed in a central management entity, and instances of other aspects of the computational environment are distributed to gateway terminals and/or other suitable nodes of the ground network. FIG. 7 provides a schematic illustration of an embodiment of a computational system 700 that can implement various system components and/or perform various steps of methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computational system 700 is shown including hardware elements that can be electrically coupled via a bus 705 (or may otherwise be in communication, as appropriate). The hardware elements may include one or more processors 710, including, without limitation, a set of (i.e., one or more) general-purpose processors and/or special-purpose processors (such as digital signal processing chips, graphics acceleration processors, video decoders, and/or the like). Optionally, embodiments of the computational system 700 can include one or more input/output (I/O) devices 715. The I/O devices 715 can include user input devices (e.g., a mouse, a keyboard, remote control, touchscreen interfaces, audio interfaces, video interfaces, and/or the like), machine input devices (e.g., computer-to-computer interfaces, such as wired and/or wireless input data ports), user output devices (e.g., display devices, printers, and/or the like), and/or machine input devices (e.g., computer-to-computer interfaces, such as wired and/or wireless output data ports).

The computational system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random-access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 725 include one or more of a power management (PM) parameter data store 726 for storing static and/or dynamic (e.g., including semi-dynamic) PM parameter data, an ephemeris data store 727 for storing ephemeris data for the constellation of NGSO smallsats, and a subscriber data store 728 for storing numbers of subscribers in GRs and/or their service plans. The storage devices 725 can also be used to store any other data for facilitating embodiments herein, such as one or more thresholds (e.g., an SoC threshold), traffic demand trends, machine learning networks, machine learning training data, etc.

The computational system 700 can also include a communications subsystem 730. Embodiments of the communications subsystem 730 include any suitable components for interfacing with gateway terminals, NGSO smallsats, etc. For example, as described herein, embodiments send and receive TT&C signals. Some embodiments of the communications subsystem 730 can also include, without limitation, a modem, a network card (wireless or wired), an infrared communication device, a wireless communication device, and/or a chipset (such as a Bluetooth™ device, another 802.11 device, a WiMax device, cellular communication device, etc.), and/or the like.

Embodiments of the computational system 700 can further include a working memory 735, which can include a RAM or ROM device, as described herein. The computational system 700 also can include software elements, shown as currently being located within the working memory 735, including an operating system 740, device drivers, executable libraries, and/or other code, such as one or more application programs 745, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general-purpose computer (or other device) to perform one or more operations in accordance with the described methods.

In some embodiments, the operating system 740 and the working memory 735 are used in conjunction with the one or more processors 710 to implement a payload manager 340 and/or a smart scheduler 345, as described herein. For example, the smart scheduler 345 can, when stored instructions are implemented by the processor(s) 710, control power used by the constellation of NGSO smallsats. As described herein, this can be performed iteratively for each of a plurality of timesteps, and further iteratively (i.e., for each timestep) for each of a plurality of grid regions (GRs) representing a corresponding segment of a geographic coverage area of the satellite communication system. The power control by the smart scheduler 345 can include: determining, based on predefined orbital dynamics of the constellation of NGSO smallsats, a subset of the NGSO smallsats as those having an orbital location during the time step corresponding to coverage of the GR; determining whether any of a plurality of payloads of the subset of the NGSO smallsats are mutable payloads for the timestep; and communicating with the subset of NGSO smallsats to control power to the plurality of payloads so that all the mutable payloads of the plurality of payloads are muted for the timestep and all other payloads of the plurality of payloads are unmuted for the timestep.

A set of these instructions and/or codes can be stored on a non-transitory (or non-transient) computer-readable storage medium, such as the non-transitory storage device(s) 725 described above. In some cases, the storage medium can be incorporated within a computer system, such as computational system 700. In other embodiments, the storage medium can be separate from a computer system (e.g., a removable medium, such as a compact disc), and/or provided in an installation package, such that the storage medium can be used to program, configure, and/or adapt a general-purpose computer with the instructions/code stored thereon. These instructions can take the form of executable code, which is executable by the computational system 700 and/or can take the form of source and/or installable code, which, upon compilation and/or installation on the computational system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computational system 700) to perform methods in accordance with various embodiments of the invention. According to a set of embodiments, some or all of the procedures of such methods are performed by the computational system 700 in response to processor 710 executing one or more sequences of one or more instructions (which can be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 can cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computational system 700, various computer-readable media can be involved in providing instructions/code to processor(s) 710 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735. Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a disk of a remote computer. The remote computer can load the instructions into its dynamic memory and send the instructions as signals over a transmission medium to be received and/or executed by the computational system 700. The communications subsystem 730 (and/or components thereof) generally will receive signals, and the bus 705 then can carry the signals (and/or the data, instructions, etc., carried by the signals) to the working memory 735, from which the processor(s) 710 retrieves and executes the instructions. The instructions received by the working memory 735 may optionally be stored on a non-transitory storage device 725 either before or after execution by the processor(s) 710.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for adaptive satellite power management for a satellite communication system having a constellation of non-geosynchronous orbit (NGSO) smallsats, the method comprising:

controlling power used by the constellation of NGSO smallsats by, iteratively, for each of a plurality of timesteps:

iteratively, for each of a plurality of grid regions (GRs), each GR representing a corresponding segment of a geographic coverage area of the satellite communication system:

determining, based on predefined orbital dynamics of the constellation of NGSO smallsats, a subset of the NGSO smallsats as those having an orbital location during the timestep corresponding to coverage of the GR;

determining whether any of a plurality of payloads of the subset of the NGSO smallsats are mutable payloads for the timestep; and communicating with the subset of NGSO smallsats to control power to the plurality of payloads so that all the mutable payloads of the plurality of payloads are muted for the timestep and all other payloads of the plurality of payloads are unmuted for the timestep.

2. The method of claim 1, further comprising:

generating, prior to the controlling power, a grid definition for the coverage area that defines the GRs.

3. The method of claim 1, wherein determining whether any of the plurality of payloads of the subset of the NGSO smallsats are mutable payloads for the timestep comprises:

determining whether there is a grid-level access restriction for the GR; and if there is a grid-level access restriction for the GR, identifying all user-link payloads of the subset of NGSO smallsats as the mutable payloads for the timestep.

4. The method of claim 1, wherein determining whether any of the plurality of payloads of the subset of the NGSO smallsats are mutable payloads for the timestep comprises:

obtaining position information for each of the subset of NGSO smallsats in the GR in the timestep, and topological blockage information for the GR;

determining a subset of the plurality of payloads of the subset of NGSO smallsats as having visibility that is topologically blocked based on corresponding portions of the position information in the GR in the timestep and the topological blockage information for the GR; and determining the mutable payloads for the timestep to include the subset of the plurality of payloads.

5. The method of claim 1, wherein determining whether any of the plurality of payloads of the subset of the NGSO smallsats are mutable payloads for the timestep comprises:

obtaining position information in the timestep for the sun, for each of the subset of NGSO smallsats, and for coverage areas of the user-link payloads of the subset of NGSO smallsats; and determining the mutable payloads for the timestep to include one of the user-link payloads of one of the subset of NGSO smallsats responsive to determine that the one of the user-link payloads has a sun outage condition due to an alignment in the timestep between positions of the sun, the one of the subset of NGSO smallsats, and a corresponding one of the coverage areas of the one of the user-link payloads.

6. The method of claim 1, wherein determining whether any of the plurality of payloads of the subset of the NGSO smallsats are mutable payloads for the timestep comprises:

identifying X of the plurality of payloads of the subset of NGSO smallsats as candidate mutable payloads;

ranking each of the X candidate mutable payloads based on a respective magnitude of impact to providing communication services in the GR in the timestep that is estimated to result from muting the candidate mutable payload; and selecting Y mutable payloads as a subset of the X candidate mutable payloads ranked as having lowest ones of the respective magnitudes of impact, wherein X and Y are positive integers, and X is greater than Y.

7. The method of claim 1, wherein determining whether any of the plurality of payloads of the subset of the NGSO smallsats are mutable payloads for the timestep comprises:

computing a payload resource demand estimate for the GR for the timestep; and identifying user-link payloads of the subset of NGSO smallsats as mutable payloads for the timestep by determining at least that the payload resource demand estimate is satisfiable by the subset of NGSO smallsats without using the mutable payloads.

8. The method of claim 7, wherein computing the payload resource demand estimate for the GR for the timestep is based on obtaining subscription information indicating a quantity of subscribers to communication services of the satellite communication system in the GR and service plans associated with the subscribers in the GR.

9. The method of claim 7, wherein computing the payload resource demand estimate for the GR for the timestep is based on obtaining, from one or more of the constellation of NGSO smallsats, data indicating present usage of payload resources by subscribers to communication services of the satellite communication system in the GR.

10. The method of claim 7, wherein:

each payload comprises an uplink subsystem and a downlink subsystem; and determining whether any of the plurality of payloads of the subset of the NGSO smallsats are mutable payloads for the timestep comprises:

determining, based on the payload resource demand estimate, whether any payloads of the subset of NGSO smallsats is tasked during the timestep in the GR with only downlink communications or with only uplink communications;

responsive to determining that one or more of the payloads of the subset of NGSO smallsats is tasked during the timestep in the GR with only downlink communications, muting the uplink subsystem of the one or more of the payloads of the subset of NGSO smallsats; and responsive to determining that one or more of the payloads of the subset of NGSO smallsats is tasked during the timestep in the GR with only uplink communications, muting the downlink subsystem of the one or more of the payloads of the subset of NGSO smallsats.

11. The method of claim 7, wherein:

a first portion of the subset of the NGSO smallsats are each configured to support lower-band user communications, and a second portion of the subset of the NGSO smallsats are each configured to support higher-band user communications;

computing the payload resource demand estimate for the GR for the timestep comprises computing a lower-band resource demand estimate and a higher-band resource demand estimate; and determining whether any of the plurality of payloads of the subset of the NGSO smallsats are mutable payloads for the timestep comprises:

determining, based on the lower-band resource demand estimate, whether any payloads of the first portion of the subset of NGSO smallsats is mutable; and determining, based on the higher-band resource demand estimate, whether any payloads of the second portion of the subset of NGSO smallsats is mutable.

12. The method of claim 7, wherein:

each of the subset of the NGSO smallsats hosts at least a lower-band user-link payload and a higher-band user-link payload;

computing the payload resource demand estimate for the GR for the timestep comprises computing a lower-band resource demand estimate and a higher-band resource demand estimate; and determining whether any of the plurality of payloads of the subset of the NGSO smallsats are mutable payloads for the timestep comprises:

determining, based on the lower-band resource demand estimate, whether any payloads of the lower-band user-link payloads are mutable; and determining, based on the higher-band resource demand estimate, whether any payloads of the higher-band user-link payloads are mutable.

13. The method of claim 1, wherein determining whether any of the plurality of payloads of the subset of the NGSO smallsats are mutable payloads for the timestep comprises:

obtaining a present state of charge measurement from each of the subset of NGSO smallsats; and identifying all payloads of one or more of the subset of NGSO smallsats as mutable for the timestep responsive to determining that the one or more of the subset of NGSO smallsats is presently in an eclipse phase of its orbital path and has a present state of charge measurement below a predefined state of charge threshold.

14. The method of claim 1, wherein determining whether any of the plurality of payloads of the subset of the NGSO smallsats are mutable payloads for the timestep comprises:

determining whether any operational gateway terminals are located in the GR; and identifying feeder-link payloads of the subset of NGSO smallsats as mutable for the timestep responsive to determining that there are no operational gateway terminals located in the GR.

15. The method of claim 1, wherein:

each of the subset of NGSO smallsats hosts at least one inter-satellite link (ISL) payload; and determining whether any of the plurality of payloads of the subset of the NGSO smallsats are mutable payloads for the timestep comprises identifying one or more ISL payloads of the subset of NGSO smallsats as mutable payloads for the timestep.

16. A smart scheduler system disposed in a ground network portion of a satellite communication system having a constellation of non-geosynchronous orbit (NGSO) smallsats, the smart scheduler system comprising:

one or more processors; and a non-transitory memory having instructions stored thereon which, when executed, cause the one or more processors to control power used by the constellation of NGSO smallsats by, iteratively, for each of a plurality of timesteps, performing steps comprising:

iteratively, for each of a plurality of grid regions (GRs), each GR representing a corresponding segment of a geographic coverage area of the satellite communication system:

determining, based on predefined orbital dynamics of the constellation of NGSO smallsats, a subset of the NGSO smallsats as those having an orbital location during the time step corresponding to coverage of the GR;

determining whether any of a plurality of payloads of the subset of the NGSO smallsats are mutable payloads for the timestep; and communicating with the subset of NGSO smallsats to control power to the plurality of payloads so that all the mutable payloads of the plurality of payloads are muted for the timestep and all other payloads of the plurality of payloads are unmuted for the timestep.

17. The smart scheduler system of claim 16, wherein determining whether any of the plurality of payloads of the subset of the NGSO smallsats are mutable payloads for the timestep comprises:

determining whether there is a grid-level access restriction for the GR;

if there is a grid-level access restriction for the GR, identifying all of the plurality of payloads of the subset of the NGSO smallsats as mutable payloads for the timestep; and if there is not a grid-level access restriction for the GR:

determining whether there is a topological blockage and/or a sun outage condition impacting one or more of the plurality of payloads of the subset of the NGSO smallsats;

if there is a topological blockage and/or a sun outage condition impacting one or more of the plurality of payloads of the subset of the NGSO smallsats, identifying a first one or more of the plurality of payloads of the subset of the NGSO smallsats as mutable payloads for the timestep; and identifying a second one or more of the plurality of payloads of the subset of the NGSO smallsats as mutable payloads for the time step based on determining whether a payload resource demand estimate for the GR for the timestep is satisfiable with the second one or more of the plurality of payloads muted.

18. The smart scheduler system of claim 16, wherein:

the one or more processors is disposed at least partially in a central management entity of a ground portion of the satellite communication system; and the central management entity is communicatively coupled with the constellation of NGSO smallsats via a plurality of geographically diverse gateway terminals.

19. The smart scheduler system of claim 18, wherein:

each of the subset of NGSO smallsats comprises a telemetry, tracking, and command (TT&C) block; and the communicating with the subset of NGSO smallsats to control power to the plurality of payloads comprises transmitting power control messages from the central management entity to the TT&C block of each of the subset of NGSO smallsats via one or more of the gateway terminals.

20. The smart scheduler system of claim 16, wherein the constellation of NGSO smallsats comprises a plurality of low-Earth orbit (LEO) smallsats in each of a plurality of orbits.

\* \* \* \* \*